United States Patent
Kim et al.

(10) Patent No.: US 11,341,973 B2
(45) Date of Patent: May 24, 2022

(54) METHOD AND APPARATUS FOR RECOGNIZING SPEAKER BY USING A RESONATOR

(71) Applicant: SAMSUNG ELECTRONICS CO., LTD., Suwon-si (KR)

(72) Inventors: Cheheung Kim, Yongin-si (KR); Sungchan Kang, Hwaseong-si (KR); Sangha Park, Seoul (KR); Yongseop Yoon, Seoul (KR); Choongho Rhee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 16/474,465

(22) PCT Filed: Dec. 19, 2017

(86) PCT No.: PCT/KR2017/015020
§ 371 (c)(1),
(2) Date: Jun. 27, 2019

(87) PCT Pub. No.: WO2018/124590
PCT Pub. Date: Jul. 5, 2018

(65) Prior Publication Data
US 2019/0348050 A1    Nov. 14, 2019

(30) Foreign Application Priority Data
Dec. 29, 2016    (KR) .................. 10-2016-0182792

(51) Int. Cl.
*G10L 17/02*    (2013.01)
*G10L 17/14*    (2013.01)
(Continued)

(52) U.S. Cl.
CPC ............ *G10L 17/14* (2013.01); *G01H 13/00* (2013.01); *G10L 17/02* (2013.01); *G10L 17/04* (2013.01); *G10L 17/20* (2013.01)

(58) Field of Classification Search
CPC ......... G10L 17/14; G10L 17/02; G10L 17/04; G10L 17/20; G10L 13/033; G10L 15/02
See application file for complete search history.

(56) References Cited

U.S. PATENT DOCUMENTS 4,343,969 A * 8/1982 Kellett .................... G10L 15/00
704/251
4,379,949 A * 4/1983 Chen ....................... H04B 1/66
375/240
(Continued)

FOREIGN PATENT DOCUMENTS

CN    102655003 A    9/2012
CN    106034276 A    10/2016
(Continued)

OTHER PUBLICATIONS

Mokhtari et al., "Contributions of Selected Spectral Regions to Vowel Classification Accuracy", ICSLP 94, Yokohama, 1994 International Conference on Spoken Language Processing, Sep. 18, 1994, pp. 1923-1926, 4 pages total, XP000855655.
(Continued)

*Primary Examiner* — Jakieda R Jackson
(74) *Attorney, Agent, or Firm* — Sughrue Mion, PLLC

(57) ABSTRACT

Provided are a method and device for recognizing a speaker by using a resonator. The method of recognizing the speaker includes receiving a plurality of electrical signals corresponding to a speech of the speaker from a plurality of resonators having different resonance bands; obtaining a difference of magnitudes of the plurality of electrical sig-
(Continued)

nals; and recognizing the speaker based on the difference of magnitudes of the plurality of electrical signals.

22 Claims, 15 Drawing Sheets

(51) Int. Cl.
*G01H 13/00* (2006.01)
*G10L 17/04* (2013.01)
*G10L 17/20* (2013.01)

(56) References Cited

U.S. PATENT DOCUMENTS

| | | | |
|---|---|---|---|
| 5,054,085 A * | 10/1991 | Meisel | H04R 1/08 704/207 |
| 5,729,694 A * | 3/1998 | Holzrichter | G06Q 20/204 704/270 |
| 5,856,722 A | 1/1999 | Haronian et al. | |
| 6,227,054 B1 | 5/2001 | Ando et al. | |
| 6,718,306 B1 | 4/2004 | Satoh et al. | |
| 6,791,433 B1 | 9/2004 | Duerig et al. | |
| 7,502,736 B2 | 3/2009 | Hong et al. | |
| 7,863,714 B2 | 1/2011 | Diamond et al. | |
| 7,906,969 B2 * | 3/2011 | Machida | A61B 5/055 324/318 |
| 7,991,167 B2 * | 8/2011 | Oxford | H04R 3/005 381/92 |
| 8,103,027 B2 | 1/2012 | Zhang et al. | |
| 8,170,244 B2 | 5/2012 | Ryan et al. | |
| 9,805,738 B2 * | 10/2017 | Krini | G10L 19/06 |
| 2001/0021904 A1 * | 9/2001 | Plumpe | G10L 19/06 704/209 |
| 2002/0028021 A1 * | 3/2002 | Foote | G06K 9/00758 382/224 |
| 2004/0158466 A1 * | 8/2004 | Miranda | G10L 15/1807 704/236 |
| 2005/0033573 A1 * | 2/2005 | Hong | G10L 15/063 704/250 |
| 2006/0004567 A1 | 1/2006 | Russell | |
| 2008/0270140 A1 * | 10/2008 | Hertz | G10L 13/033 704/267 |
| 2009/0326939 A1 * | 12/2009 | Toner | H04M 7/0042 704/235 |
| 2012/0150541 A1 * | 6/2012 | Talwar | G10L 15/065 704/249 |
| 2012/0265534 A1 * | 10/2012 | Coorman | G10L 13/033 704/265 |
| 2014/0142958 A1 * | 5/2014 | Sharma | G10L 19/02 704/500 |
| 2016/0026253 A1 * | 1/2016 | Bradski | H04N 13/344 345/8 |
| 2016/0050506 A1 | 2/2016 | Kim | |
| 2016/0195484 A1 * | 7/2016 | Emery | G01R 19/0092 702/65 |
| 2016/0379622 A1 * | 12/2016 | Patel | G10L 13/033 704/260 |
| 2017/0249953 A1 * | 8/2017 | Yassa | G10L 25/90 |
| 2018/0038901 A1 | 2/2018 | Kim et al. | |

FOREIGN PATENT DOCUMENTS

| | | |
|---|---|---|
| JP | 2-500864 A | 3/1990 |
| JP | 10-97274 A | 4/1998 |
| JP | 2002-196784 A | 7/2002 |
| JP | 2004-538526 A | 12/2004 |
| JP | 2005-202309 A | 7/2005 |
| JP | 2007-529787 A | 10/2007 |
| KR | 10-2001-0080735 A | 8/2001 |
| KR | 10-2003-0013855 A | 2/2003 |
| KR | 10-2010-0115033 A | 10/2010 |
| KR | 10-2014-0050951 A | 4/2014 |
| WO | 89/00747 A1 | 1/1989 |

OTHER PUBLICATIONS

Communication dated Jul. 24, 2020 issued by the European Patent Office in European Application No. 17888519.0.

Xu Yixue & Kong Jiangping, "Vocal Tract Characteristic on Long-Term Formant Distribution", 2012, 2nd International Conference on Computer Science and Network Technology, pp. 207-211, (5 pages total).

Communication dated Apr. 6, 2021 by the China National Intellectual Property Administration in Chinese English Patent Application No. 201780080753.X.

Commuhication dated Dec. 21, 2021 by the Japanese Patent Office in Japanese Patent Application No. 2019-534648.

* cited by examiner

FIG. 8

| Resonator Difference | | | | | | | |
|---|---|---|---|---|---|---|---|
| -1 | 1 | -1 | -1 | 0 | 1 | -1 | 0 |
| -1 | 1 | 0 | 1 | -1 | 0 | -1 | 1 |
| 0 | 0 | 1 | 0 | 1 | 0 | -1 | 0 |
| 0 | 0 | 0 | 0 | 0 | 0 | 1 | 1 |
| -1 | 0 | 0 | 0 | 0 | 1 | 1 | 0 |
| -1 | 1 | 1 | 0 | 0 | 0 | 0 | -1 |
| -1 | 0 | 0 | 1 | 0 | 0 | -1 | 0 |
| 1 | 0 | 1 | 1 | 1 | 1 | -1 | 1 |
| 0 | 1 | 0 | 0 | 1 | 1 | -1 | 0 |
| -1 | 0 | 0 | -1 | 0 | 0 | 1 | 1 |
| -1 | 1 | 1 | 1 | 0 | 0 | 1 | 0 |
| -1 | 0 | 0 | 0 | 0 | 0 | 0 | -1 |
| 1 | 1 | 0 | 0 | 1 | 1 | 0 | 1 |
| 1 | 0 | 1 | 0 | 0 | 0 | -1 | 0 |
| 0 | -1 | 0 | 0 | 0 | 0 | -1 | 0 |
| 0 | 1 | 1 | 1 | 1 | 1 | -1 | 0 |
| -1 | 0 | 1 | 1 | -1 | 0 | 0 | 0 |
| -1 | 0 | 0 | 0 | 0 | 0 | 0 | 0 |
| -1 | 0 | 0 | 0 | 0 | 0 | 0 | 0 |
| 1 | 0 | -1 | 1 | 1 | 1 | 0 | 0 |
| 0 | -1 | 0 | 0 | 0 | 0 | 1 | 1 |
| -1 | 1 | 1 | 1 | 0 | 0 | 1 | 1 |
| 0 | 0 | 0 | 0 | 1 | 1 | 0 | 0 |

Time Frames

METHOD AND APPARATUS FOR RECOGNIZING SPEAKER BY USING A RESONATOR

CROSS-REFERENCE TO RELATED APPLICATIONS

This application is a U.S. national stage entry under 35 U.S.C. 371(c) of International Application No. PCT/KR2017/015020, filed on Dec. 19, 2017, in the Korean Patent Office, which claims priority from Korean Patent Application No. 10-2016-0182792, filed on Dec. 29, 2016, in the Korean Intellectual Property Office, the disclosures of which are herein incorporated by reference in their entireties.

BACKGROUND

1. Field

Methods and apparatuses consistent with example embodiments relate to a method and an apparatus for recognizing a speaker by using a resonator.

2. Description of the Related Art

Spectrum analyzers that analyze the spectrum of sound or vibration may be used in a variety of devices. For example, spectrum analyzers may be employed in a computer, an automobile, a mobile phone, or a home appliance for speech recognition, speaker recognition, and situation recognition related to sound or vibration. Also, spectrum analyzers may be mounted on buildings, various home appliances, etc., for analyzing vibration information.

Spectrum analyzers may include sensors such as a mechanical resonator and an electrical analog or digital filter may be used to filter a signal of a frequency band of a specific region. A Fourier transform or the like may be performed by using signals obtained from the sensor to analyze the spectrum.

SUMMARY

One or more example embodiments provide a method of recognizing a speaker by using a resonator with improved accuracy and efficiency.

One or more example embodiments provide an apparatus for recognizing a speaker including a resonator with improved accuracy and efficiency.

According to an aspect of an example embodiment, provided is a method of recognizing a speaker, the method including: receiving a plurality of electrical signals corresponding to a speech of the speaker from a plurality of resonators having different resonance bands; obtaining a difference of magnitudes of the plurality of electrical signals; and recognizing the speaker based on the difference of magnitudes of the plurality of electrical signals.

The difference of magnitudes of the plurality of electrical signals may include a difference of magnitudes of electrical signals output from two resonators having neighboring resonance frequencies.

The recognizing the speaker may include generating a bitmap of a band gradient by encoding the difference of magnitudes of the plurality of electrical signals; and recognizing the speaker based on the bitmap of the band gradient.

The encoding may include converting the difference of magnitudes of the plurality of electrical signals into any one of three or more odd-number of values, by using one or more threshold values.

The three or more odd-number of values may include values that have a same absolute value and opposite signs.

The three or more odd-number of values may include −a, 0, and a (where a is a constant).

The recognizing the speaker may include registering the speaker, the registering including: generating a speaker model based on the bitmap of the band gradient; and registering the speaker model as an authentication template.

The recognizing the speaker may include determining whether the speaker is a registered speaker by performing: generating a characteristic value based on the bitmap of the band gradient; and determining whether the speaker is the registered speaker based on comparison between the characteristic value and the authentication template.

The recognizing the speaker may include determining a vowel included in the speech of the speaker based on the difference of magnitudes of the plurality of electrical signals.

The determining the vowel may include estimating relative positions of formants based on the difference of magnitudes of the plurality of electrical signals; and determining the vowel based on the relative positions of the formants.

A number of the formants may be three.

The difference of magnitudes of the plurality of electrical signals may be determined based on magnitudes of electrical signals received from four resonators of a resonator sensor.

The difference of magnitudes of the plurality of electrical signals may include a plurality of differences of magnitudes of the plurality of electrical signals, and the recognizing the speaker may include: assigning a weight to a model corresponding to the determined vowel in an authentication template; generating a bitmap of a band gradient based on a first difference of magnitudes of the plurality of electrical signals, which is different from a second difference of magnitudes of the plurality of electrical signals used to determine the vowel; generating a characteristic value based on the bitmap of the band gradient; and recognizing whether the speaker is a registered speaker based on comparison between the characteristic value and the authentication template, in which the model corresponding to the determined vowel is assigned the weight.

The assigning the weight may include: assigning the weight to the model corresponding to the determined vowel that is higher than a weight assigned to a model corresponding to another vowel.

The weight assigned to the model corresponding to the determined vowel may be 1 and the weight assigned to the model corresponding to the another vowel may be 0.

A number of the first difference of magnitudes of the plurality of electrical signals used to generate the bitmap of the band gradient may be greater than a number of the second difference of magnitudes of the plurality of electrical signals used to determine the vowel.

According to another aspect of an example embodiment, there is provided an apparatus for recognizing a speaker, the apparatus including: a resonator sensor including a plurality of resonators having different resonance bands, the plurality of resonators configured to output a plurality of electrical signals corresponding to a speech of the speaker; and a processor configured to obtain a difference of magnitudes of the plurality of electrical signals and recognize the speaker based on the difference of magnitudes of the plurality of electrical signals.

The difference of magnitudes of the plurality of electrical signals may include a difference of magnitudes of electrical signals output from two resonators having neighboring resonance frequencies.

The processor may be further configured to generate a bitmap of a band gradient by encoding the difference of magnitudes of the plurality of electrical signals and recognize the speaker based on the bitmap of the band gradient.

The processor may be further configured to encode the difference of magnitudes of the plurality of electrical signals by converting the difference of magnitudes of the plurality of electrical signals into any one of three or more odd-number of values, by using one or more threshold values.

The processor may be further configured to determine whether the speaker is a registered speaker based on comparison between a characteristic value determined based on the bitmap of the band gradient and a registered authentication template.

The processor may be further configured to determine a vowel included in the speech of the speaker based on the difference of magnitudes of the plurality of electrical signals.

The processor may be further configured to estimate relative positions of formants based on the difference of magnitudes of the plurality of electrical signals and determine the vowel based on the relative positions of the formants.

The difference of magnitudes of the plurality of electrical signals may be determined based on magnitudes of electrical signals received from four resonators of the resonator sensor.

The difference of magnitudes of the plurality of electrical signals may include a plurality of differences of magnitudes of the plurality of electrical signals, and the processor may be further configured to: assign a weight to a model corresponding to the determined vowel in an authentication template, generate a characteristic value based on a first difference of magnitudes of the plurality of electrical signals, which is different from a second difference of magnitudes of the plurality of electrical signals used to determine the vowel, and recognize the speaker based on comparison between the characteristic value and the authentication template, in which the model corresponding to the determined vowel is as signed.

The processor may be further configured to assign the weight to the model corresponding to the determined vowel that is higher than a weight assigned to a model corresponding to another vowel.

According to still another aspect of an example embodiment, provided is a method of recognizing a speaker, the method including: receiving signals of a frequency band corresponding to a speech of the speaker; obtaining a difference of magnitudes of the signals; determining a vowel included in the speech of the speaker based on the difference of magnitudes of the signals; and determining whether the speaker is a registered speaker based on the determined vowel.

The determining the vowel may include: estimating relative positions of formants based on the difference of magnitudes of the signals; and determining the vowel based on the relative positions of the formants.

The receiving may include receiving the signals of the frequency band from a plurality of resonators having different resonance bands.

The determining whether the speaker is the registered speaker may include: assigning a weight to a model corresponding to the determined vowel in an authentication template; generating a characteristic value of the speaker corresponding to the speech of the speaker; determining whether the speaker is the registered speaker based on comparison between the characteristic value and the authentication template, in which the model corresponding to the determined vowel is assigned the weight.

The assigning the weight may include: assigning the weight to the model corresponding to the determined vowel to be higher than a weight assigned to a model corresponding to another vowel.

The weight assigned to the model corresponding to the determined vowel may be 1 and the weight assigned to the model corresponding to the another vowel may be 0.

BRIEF DESCRIPTION OF THE DRAWINGS

The above and/or other aspects of the disclosure will become apparent and more readily appreciated from the following description of example embodiments, taken in conjunction with the accompanying drawings, in which:

FIG. 8 is a diagram showing a bitmap of a two-dimensional band gradient over time according to an example embodiment;

DETAILED DESCRIPTION

Figure 1:
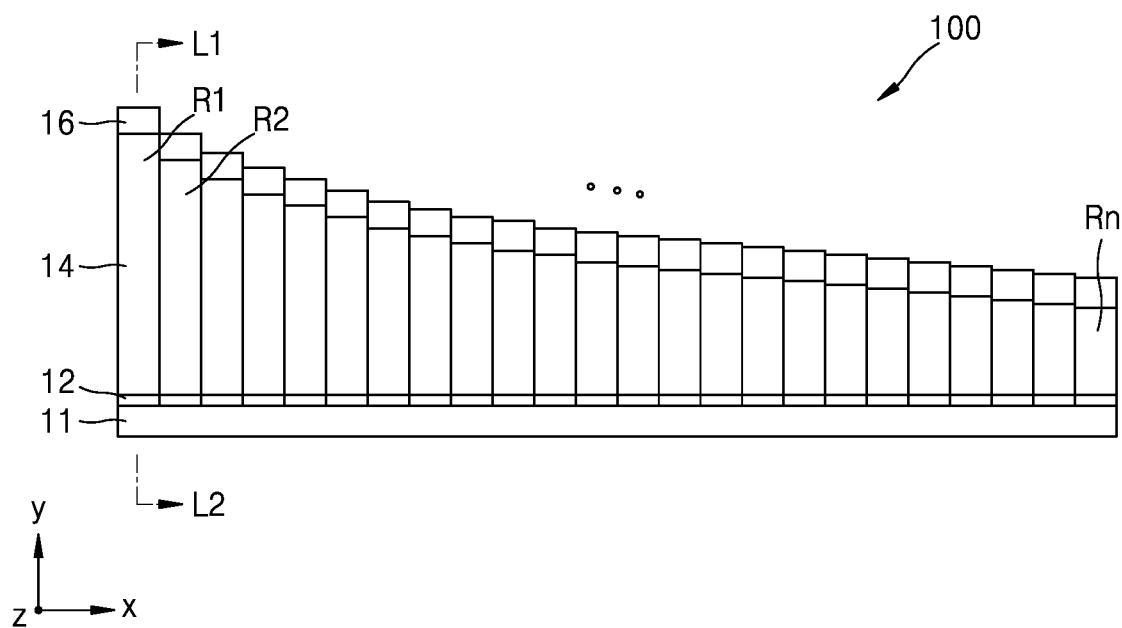
FIG. 1 is a plan view showing a schematic structure of a resonator sensor including a plurality of resonators according to an example embodiment.

Hereinafter, example embodiments will be described in detail with reference to the accompanying drawings. In the following drawings, like reference numerals refer to like elements, and the size of each element in the drawings may be exaggerated for clarity and convenience of explanation. The embodiments described below are merely examples, and various modifications are possible. Hereinafter, when a constituent element is disposed "above" or "on" to another constituent element, the constituent element may be only directly on the other constituent element or above the other constituent elements in a non-contact manner. Also, the terms "comprises" and/or "comprising" used herein specify the presence of stated features or components, but do not preclude the presence or addition of one or more other features or components unless specifically stated otherwise.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that, although the terms first, second, third, etc., may be used herein to describe various elements, these elements should not be limited by these terms. These terms are only used to distinguish one element from another element. In addition, the terms, such as 'part' or 'unit', etc., should be understood as a unit that performs at least one function or operation and that may be embodied as hardware, software, or a combination thereof.

FIG. 1 is a plan view showing a schematic structure of a resonator sensor including a plurality of resonators according to an example embodiment.

A resonator sensor 100 of FIG. 1 may be used as a spectrum analyzer configured to analyze the spectrum of sound or vibration. The resonator sensor 100 may include a plurality of resonators having different resonance bands, for example, a first resonator R1, a second resonator R2, . . . , an n-th resonator Rn. The number of unit resonators included in the resonator sensor 100 may be two or more and may be determined according to a user selection. However, embodiments are not limited thereto. The resonators R1, R2, . . . , Rn may be formed to have a length of about several millimeters (mm) or less and may be manufactured by using, for example, a micro electro mechanical system (MEMS) process. Each resonator resonates only for a specific frequency band, and a resonance frequency band is referred to as a resonance band.

Figure 2:
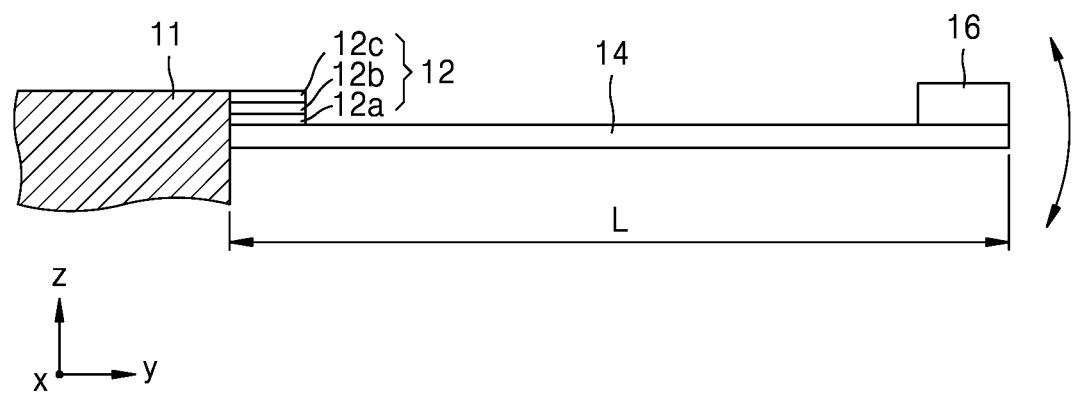
FIG. 2 is a cross-sectional view of the resonator shown in FIG. 1, taken along line L1-L2.

FIG. 2 is a cross-sectional view of a resonator according to the example embodiment shown in FIG. 1, taken along line L1-L2.

Referring to FIG. 2, the first resonator R1 may include a fixing unit 11 and a supporting unit 14 protruding from the fixing unit 11 in one direction, for example, a y direction and extending. A sensor unit 12 and a mass unit 16 may be formed on the supporting unit 14. The sensor unit 12 may be formed at a first end of the supporting unit 14, for example, in a region adjacent to the fixing unit 11. The mass unit 16 may be formed on an opposite side of the first end of the supporting unit 14, for example, in a region relatively distanced away from the fixing unit 11.

The fixing unit 11 is a region from which the supporting units 14 of the resonators R1, R2 . . . Rn protrude and may be formed of a material typically used as a substrate of an electronic device. The supporting unit 14 may be formed of Si or the like and may have a shape of a beam or a thin and elongated plate in one direction and may be referred to as a cantilever. A first end of the supporting unit 14 may be fixed by the fixing unit 11 and a second end may freely vibrate in an upward and downward direction, for example, a z direction as shown in FIG. 2 without being fixed by any object. Alternatively, unlike shown in FIG. 2, the supporting unit 14 of the resonator may have a shape in which both sides of the supporting unit 14 are fixed to the fixing unit 11 and a center portion of the supporting unit 14 vibrates.

The sensor unit 12 is configured to sense a signal generated due to movement of the supporting units of the resonators R1, R2, . . . Rn by external sound or vibration and may be, for example, a piezo sensor. The sensor unit 12 may include a lower electrode 12a, a piezoelectric material layer 12b, and an upper electrode 12c that are sequentially formed on a surface of the supporting unit 14. The lower electrode 12a and the upper electrode 12c of the sensor unit 12 may be formed of a conductive material, for example, molybdenum (Mo) or the like. An insulating layer may be optionally formed between the lower electrode 12a and the supporting unit 14. The piezoelectric material layer 12b may be used without limitation as long as the piezoelectric material layer 12b includes a piezoelectric material that is usable in the piezo sensor. The piezoelectric material layer 12b may be formed of, for example, AlN, ZnO, SnO, PZT, $ZnSnO_3$, polyvinylidene fluoride (PVDF), poly (vinylidene fluoride-trifluoroethylene) (P(VDF-TrFE)) or PMN-PT. However, the resonators R1, R2, . . . Rn are not limited to a piezoelectric type including a piezo sensor, and an electrostatic sensor may also be used.

A material for forming the mass unit 16 is not limited and may be formed of metal such as Au.

In FIG. 2, for example, a configuration in which the first resonator R1 includes the fixing unit 11, the supporting unit 14, the sensor unit 12, and the mass unit 16 may also apply to the second resonator R2 to the n-th resonator Rn of FIG. 1.

When sound, vibration or force is applied from the outside to the resonators R1, R2, . . . Rn shown in FIGS. 1 and 2, an inertial force may be generated according to the behavior of the mass unit 16. When a resonance frequency of the supporting unit 14 and a frequency of external vibration, sound or force are identical to each other, a resonance phenomenon may occur and the inertial force may increase. Such an inertial force may generate a bending moment in the sensor unit 12. The bending moment may cause stress in each layer of the sensor unit 12. In this case, a charge of magnitude proportional to the stress that is applied to the sensor unit 12 may occur in the piezoelectric material layer 12b, and a voltage is generated in inverse proportion to the capacitance between the electrodes 12a and 12c. In summary, when the voltage generated in the sensor unit 12 is detected and analyzed by an input signal such as speech, vibration, or force from the outside of the resonators R1, R2, ... Rn, information about the input signal such as speech, vibration, or force may be obtained.

A frequency band of the input signal sensed by the resonators R1, R2 ... Rn may be an audible frequency band in the range of approximately 20 Hz to 20 kHz, but is not limited thereto. Speech of an ultrasonic band of 20 kHz or more or an ultra low sound band of 20 Hz or less may be received.

An example embodiment of the disclosure provides an apparatus and a method for recognizing a speaker by using an output value detected by the resonator sensor 100, that is, an electrical signal.

Figure 3:
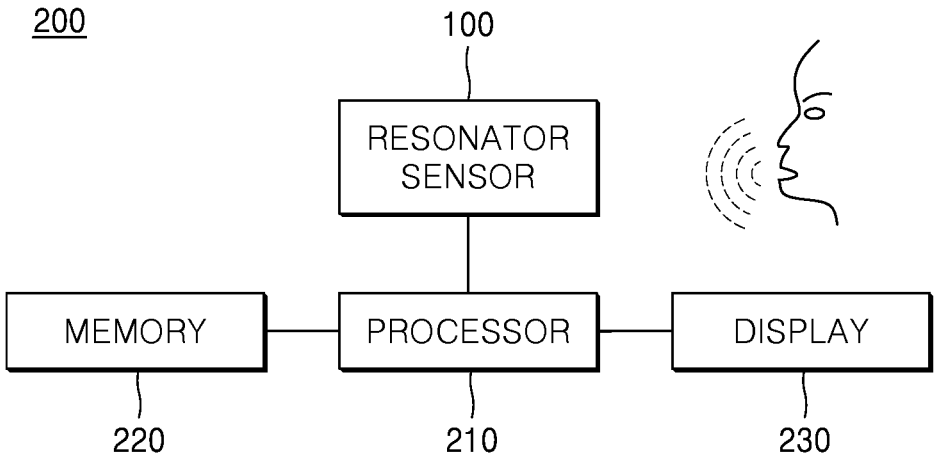
FIG. 3 is a block diagram schematically illustrating a speaker recognition apparatus including a resonator according to an example embodiment.

FIG. 3 is a block diagram schematically illustrating a speaker recognition apparatus including a resonator according to an example embodiment.

Referring to FIG. 3, a speaker recognition apparatus 200 includes the resonator sensor 100 configured to output an electrical signal of a specific value in response to an input external signal as shown in FIGS. 1 and 2, and a processor 210 configured to obtain a magnitude difference of electrical signals corresponding to resonance bands (or a difference between magnitudes of electrical signals output from resonators having different resonance bands) from the electrical signal received from the resonator sensor 100 and recognizing a speaker using the magnitude difference of electrical signals corresponding to resonance bands.

The resonator sensor 100 may include a plurality of resonators having different resonance frequencies, that is, resonance bands, as shown in FIGS. 1 and 2. Each resonator of the resonator sensor 100 may output an electrical signal corresponding to the input signal. In the resonator sensor 100, a resonator having a resonance band included in a frequency of the input signal may output an electrical signal (for example, a voltage) having a large magnitude, and a resonator having a resonance band not included in the frequency of the input signal may output an electrical signal having a small size. Accordingly, each resonator of the resonator sensor 100 may output an electrical signal corresponding to the input signal, and thus the resonator sensor 100 may output an electrical signal corresponding to the frequency of the input signal.

The resonator sensor 100 may be configured to perform at least a part of functions of the processor 210 described below. For example, the resonator sensor 100 may perform an operation of correcting an electrical signal with respect to a speech of a speaker, obtaining a characteristic of the electrical signal, or the like, in addition to an operation of detecting the speech. In this case, the resonator sensor 100 may be a functional module having a hardware module and a software module.

The processor 210 may drive an operating system and an application program to control a plurality of components connected to the processor 210. The processor 210 may perform speaker recognition using the electrical signal obtained from the resonator sensor 100.

For example, the processor 210 may obtain the magnitude difference of electrical signals corresponding to resonance bands using the electrical signal received from the resonator sensor 100 and encode the obtained magnitude difference of electrical signals corresponding to resonance bands to generate a bitmap of a band gradient. The term "magnitude difference of the resonance bands" may mean a magnitude difference of electrical signals output from resonators having different resonance bands. The bitmap of the band gradient is a map in which the magnitude difference of electrical signals corresponding to resonance bands is simplified and will be described in detail later.

The processor 210 may generate the bitmap of the band gradient from a registration process speech of a specific speaker and may generate a personalized speaker model based on the bitmap of the band gradient. The registration process speech may be a speech that is used for registering the speech of the specific speaker. For example, the processor 210 may generate characteristic values of the registration process speech of the speaker by applying fast Fourier transform (FFT), two-dimensional (2D) discrete cosine transform (DCT), dynamic time warping (DTW), an artificial neural network, vector quantization (VQ), a Gaussian mixture model (GMM), etc., to the bitmap of the band gradient and generate a personalized speaker model from the characteristic values of the registration process speech. The processor 210 may generate the personalized speaker model by applying the characteristic values of the registration process speech to a universal background model (UBM). The generated personalized speaker model may be stored in a security region of a memory 220 as an authentication template for use in comparison with a speech that is input subsequently to determine whether the input speech is a speech of the specific speaker.

When speech authentication is performed, the processor 210 may generate the bitmap of the band gradient from an input speech of an unspecified speaker, generate the characteristic values based on the bitmap of the band gradient, and authenticate the unspecified speaker based on comparison between the characteristic values and the registered authentication template. In this case, the processor 210 may convert the characteristic value of the unspecified speaker for comparison with the registered authentication template and may determine similarity by comparing the converted characteristic value with the registered authentication template. A maximum likelihood estimation method and the like may be used to determine the similarity. The processor 210 may determine that authentication is successful when the similarity is greater than a first reference value and may determine that authentication fails when the similarity is equal to or less than the first reference value. The first reference value may be predefined and have a value based on which it may be determined that the characteristic value of the unspecified speaker corresponds to the authentication template.

Additionally, the processor 210 may obtain the magnitude difference of electrical signals corresponding to resonance bands based on the electrical signal received from the resonator sensor 100 and determine a vowel by using the obtained magnitude difference of electrical signals corresponding to resonance bands. The vowel may include a plurality of formants that are frequency bands in which acoustic energy concentrates. Although a specific formant may have variance among speakers, but the variance of the specific formant is not significant so as to make it impossible to distinguish the vowel from other vowels. Therefore, a vowel that is pronounced by a plurality of speakers may be generally distinguished regardless of the speakers, and a model corresponding to the determined vowel in the authentication template may be used for speaker recognition. A vowel determination method will be described later.

The speaker recognition apparatus 200 may include the memory 220 configured to store the authentication template. The memory 220 may temporarily store information about the speech of the unspecified speaker.

Also, the speaker recognition apparatus 200 may further include a display 230 configured to display information and the like. The display 230 may display various kinds of information about speech recognition, for example, a user interface for recognition, an indicator indicating recognition results, and the like.

Figure 4:
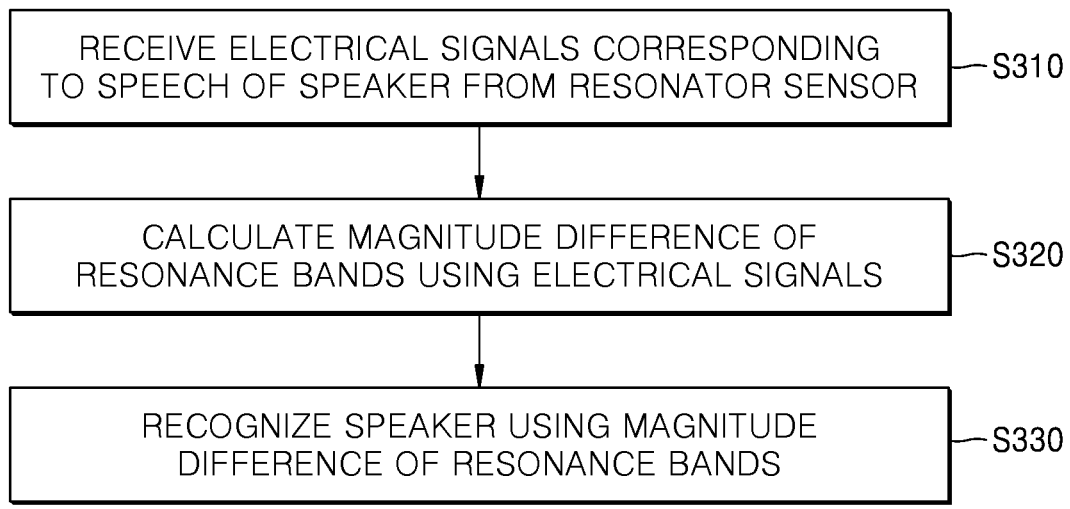
FIG. 4 is a diagram illustrating a speaker recognition method using a resonator according to an example embodiment.

FIG. 4 is a diagram illustrating a speaker recognition method using a resonator according to an example embodiment.

Referring to FIG. 4, in the speaker recognition method according to an example embodiment, the processor 210 may receive an electrical signal corresponding to a speech of a speaker from the resonator sensor 100 (S310). Each resonator of the resonator sensor 100 may output the electrical signal corresponding to the speech. The processor 210 may receive the electrical signal.

The processor 210 may calculate a magnitude difference of electrical signals corresponding to resonance bands by using the electrical signal received from the resonator sensor 100 (S320). The magnitude difference of electrical signals corresponding to resonance bands may be a magnitude difference of electrical signals output from two resonators having neighboring resonance frequencies based on a magnitude difference, for example, a frequency, of electrical signals received from different resonators.

The processor 210 may calculate the magnitude difference of electrical signals corresponding to resonance bands by using all of the resonators included in the resonator sensor 100. In FIG. 1, when first to n-th resonators have sequentially varying resonance bands, the processor 210 may obtain a magnitude difference between electrical signals received from the first resonator and a second resonator as a first magnitude difference of the resonance bands, obtain a magnitude difference between electrical signals received from the second resonator and a third resonator as a second magnitude difference of the resonance bands, and obtain a magnitude difference between electrical signals received from an (n−1)-th resonator and the n-th resonator as an (n−1)-th magnitude difference of the resonance bands.

The processor 210 may calculate the magnitude difference of electrical signals corresponding to resonance bands by using only some of the resonators included in the resonator sensor 100. For example, the processor 210 may calculate the magnitude difference of electrical signals corresponding to resonance bands by using electrical signals received from the first resonator, a fourth resonator, a k-th resonator, and the n-th resonator. When the resonance bands of the first resonator and the fourth resonator are adjacent to each other, the resonance bands of the fourth resonator and the k-th resonator are adjacent to each other, and the resonance bands of the k-th resonator and the n-th resonator are adjacent to each other, the processor 210 may calculate a difference between electrical signals received by the first resonator and the fourth resonator as a first magnitude difference of the resonance bands, calculate a difference between electrical signals received by the fourth resonator and the k-th resonator as a second magnitude difference of the resonance bands, and calculate a difference between electrical signals received by the k-th resonator and the n-th resonator as a third magnitude difference of the resonance bands.

The processor 210 may recognize a speaker using the calculated magnitude difference of electrical signals corresponding to resonance bands (S330). For example, the processor 210 may generate a bitmap of a band gradient by encoding the magnitude difference of electrical signals corresponding to resonance bands, generate a characteristic value of the speech of the speaker using the bitmap of the band gradient, and recognize the speaker by comparing the generated characteristic value to the stored authentication template. The bitmap of the band gradient is a map in which the magnitude difference of electrical signals corresponding to resonance bands is simplified. Detailed descriptions of the bitmap of the band gradient will be described later.

Additionally, the processor 210 may determine a vowel using the magnitude difference of electrical signals corresponding to resonance bands. The determined vowel may be used to determine whether an uttering speaker is a registered speaker. For example, models corresponding to the determined vowel among personalized speaker models included in the authentication template may be weighted, or only the models corresponding to the determined vowel may be used for speaker recognition. The speaker recognition apparatus 200 may recognize the speaker by using the magnitude difference of electrical signals corresponding to resonance bands. A method of using the magnitude difference of electrical signals corresponding to resonance bands may effectively remove common noise between resonance frequencies.

Figure 5:
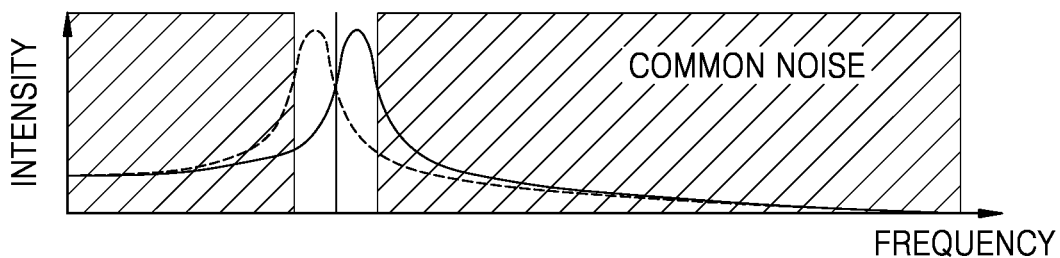
FIG. 5 is an example of a graph showing a speech having different resonance bands.

FIG. 5 is an example of a graph showing a speech having different resonance bands.

By using a magnitude difference of electrical signals corresponding to resonance bands to identify a center frequency of the resonance bands, a region hatched in FIG. 5 may be removed. The hatched region is a frequency region that is weak in relation to the center frequency of the resonance bands and may correspond to noise. Thus, a common noise having a weak correlation with the center frequency may be effectively removed by using the magnitude difference of electrical signals corresponding to resonance bands. By removing the common noise in this manner, various algorithms for noise removal may not be needed or only a simple algorithm may be used for further noise removal, thereby performing speech recognition more efficiently. In other words, the magnitude difference of electrical signals corresponding to resonance bands according to an example embodiment may be used to omit or simplify a preprocessing process for noise removal.

Figure 6:
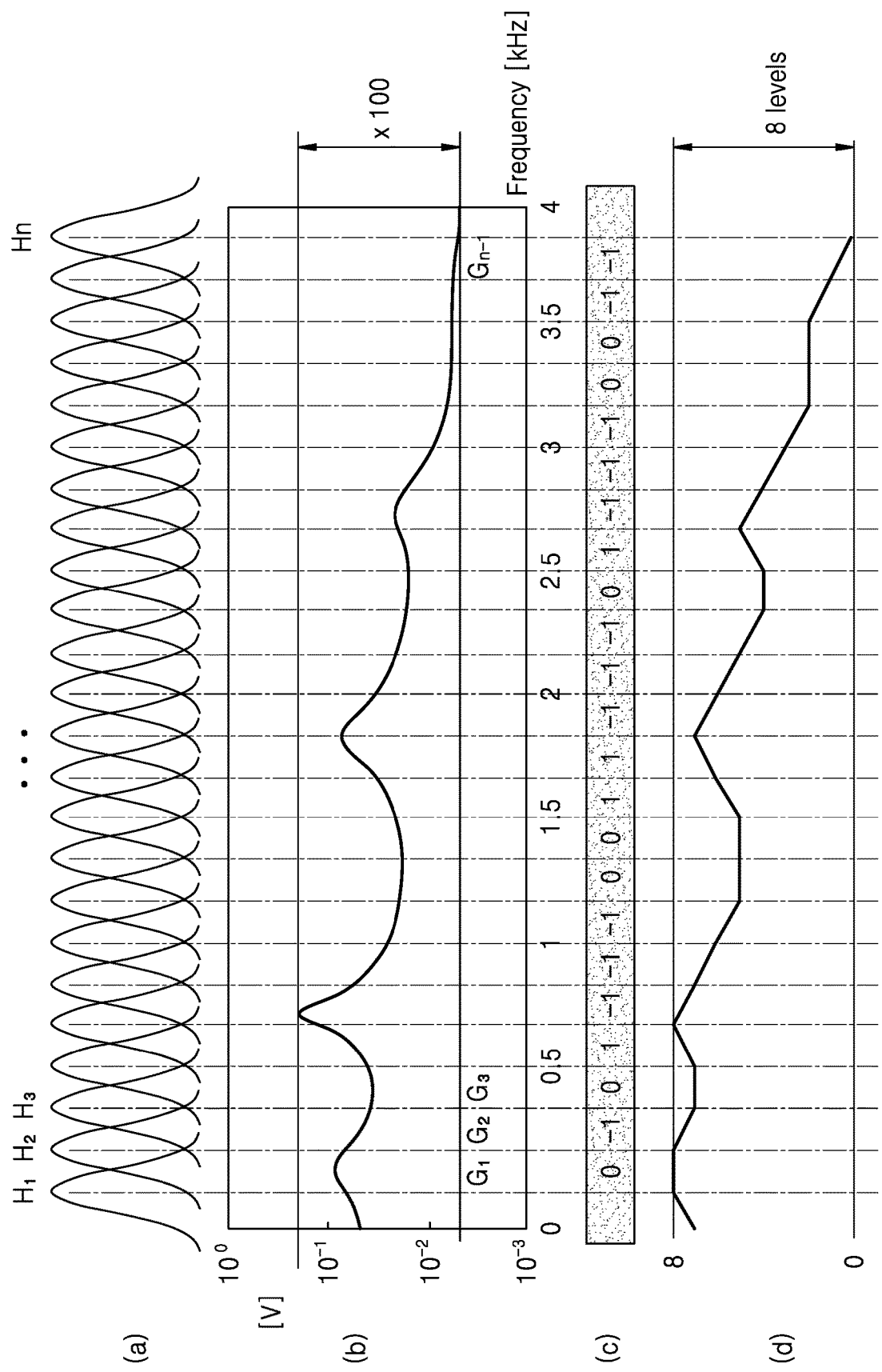
FIG. 6 is a diagram illustrating an example of generating a bitmap of a band gradient using a magnitude difference of electrical signals corresponding to resonance bands.

FIG. 6 is a diagram illustrating an example of generating a bitmap of a band gradient using a magnitude difference of electrical signals corresponding to resonance bands.

Referring to FIGS. 1 and 6, each of the resonators R1, R2, . . . , Rn of the resonator sensor 100 may output an electrical signal in response to a speaker's voice. Each of the resonators R1, R2, . . . , Rn may have a resonance frequency as shown in (a) of FIG. 6. A plurality of resonance frequencies may be mixed in the speech of a speaker. Each resonator may output an electric signal corresponding to a frequency included in the speech of the speaker. For example, when the speech of the speaker includes a first frequency H1, the first resonator R1 may resonate and output an electric signal of a large magnitude.

The processor 210 may calculate the magnitude difference of the resonance band as shown in (b) of FIG. 6 by using the electrical signal received from the resonator sensor 100. The processor 210 may calculate the magnitude difference of electrical signals corresponding to resonance bands using the electrical signal output from neighboring resonators based on the resonance frequency. (b) of FIG. 6 shows a result of calculating the magnitude difference of electrical signals corresponding to resonance bands by using all of the resonators included in the resonator sensor 100. In (a) of FIG. 6, first to n-th resonators have sequentially varying resonance bands, and thus the processor 210 may calculate a magnitude difference of electrical signals of neighboring resonators among the first to n-th resonators as the magnitude difference of electrical signals corresponding to resonance bands. For example, a first magnitude difference G1 of the resonance bands is a magnitude difference between electrical signals received by the first resonator R1 and the second resonator R2, a second magnitude difference G2 of the resonance bands is a magnitude difference between electrical signals received by the second resonator and a third resonator, and a third magnitude difference G3 of the resonance bands is a magnitude difference of electrical signals received by the third resonator and a fourth resonator. An (n−1)-th magnitude difference Gn−1 of the resonance bands is a magnitude difference between electrical signals received by an (n−1)-th resonator and the n-th resonator.

The processor 210 may encode the magnitude difference of electrical signals corresponding to resonance bands as shown in (c) of FIG. 6. For example, the processor 210 may encode a difference of speech using the following equation, $$T_k = \begin{cases} 1 & H_{k+1}(\omega) - H_k(\omega) \geq \alpha \\ 0 & -\alpha \leq H_{k+1}(\omega) - H_k(\omega) < \alpha \\ -1 & H_{k+1}(\omega) - H_k(\omega) < -\alpha \end{cases} \quad \text{[Equation 1]}$$

wherein, $H_k$ denotes a band characteristic (i.e., an electrical signal) of a k-th resonator, $H_{k+1}$ denotes a band characteristic of a (k+1)-th resonator, and $T_k$ denotes a value by encoding a characteristic difference between the k-th band resonator and the (k+1)-th resonator. The encoded value is referred to as a bit value of the resonance band. $\alpha$ denotes an arbitrary constant and may be determined according to an embodiment.

Figure 7:
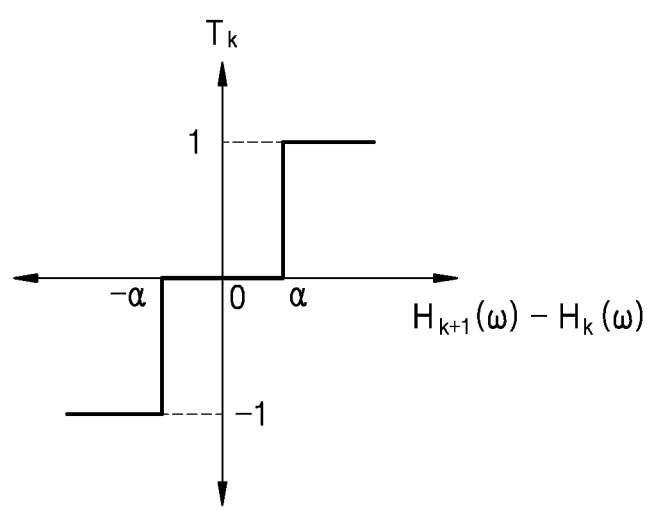
FIG. 7 is a graph illustrating an equation for encoding a magnitude difference of electrical signals corresponding to resonance bands according to an embodiment.

FIG. 7 is a graph illustrating an equation for encoding a magnitude difference of electrical signals corresponding to resonance bands according to an embodiment.

In FIG. 7, $\alpha$ and $-\alpha$ denote threshold values. An encoding value for a speech of a speaker may vary depending on the magnitude of a threshold value. Referring to Equations 1 and 7, with respect to the speech from a speaker, the processor 210 may encode the magnitude difference of electrical signals corresponding to resonance bands as three resultant values −1, 0, +1 by expressing a difference in output values between the resonators R1, R2 . . . Rn having adjacent resonance bands as 1 when the difference is equal to or greater than a specified value $\alpha$, and −1 when the difference is less than $-\alpha$, and 0 when the difference is less than $\alpha$ and equal to or greater than $-\alpha$.

In (c) of FIG. 6, encoding values of the magnitude difference of electrical signals corresponding to resonance bands may be obtained by using Equation 1 (that is, 0, −1, 0, . . . , −1) corresponding to respective frequency regions between neighboring resonators (e.g., a frequency region between the first resonator R1 and the second resonator R2, a frequency region between the second resonator R2 and the third resonator, a frequency region between the third resonator and the fourth resonator, . . . , a frequency region between the (n-th)-th resonator and the n-th resonator). (d) of FIG. 6 is a graph showing the bit values shown in (c) of FIG. 6. The maximum magnitude and the minimum magnitude of electrical signals output from the resonator sensor 100 differ by about 100 times as shown in (b) of FIG. 6. However, when a signal output from the resonator sensor 100 is converted into a bit value of a band gradient, the bit value may be simplified to 8 levels as shown in (d) of FIG. 6.

In FIG. 6, the processor 210 encodes the magnitude difference of electrical signals corresponding to resonance bands to one of values of −1, 0, and 1, but this is merely an example. The processor 210 may encode the magnitude difference of electrical signals corresponding to resonance bands in various forms. For example, the processor 210 may encode the magnitude difference of electrical signals corresponding to resonance bands to any one of three or more odd-numbered values. The corresponding values of the remaining values based on one of the three or more odd-numbered values may have the same absolute value and opposite signs. For example, the processor 210 may encode the magnitude difference of electrical signals corresponding to resonance bands to one of values of −2, −1, 0, 1, and 2. Alternatively, the processor 210 may encode the magnitude difference of electrical signals corresponding to resonance bands to any one of even-numbered values. The corresponding values of the even-numbered values may have the same absolute value and opposite signs. For example, the processor 210 may encode the magnitude difference of electrical signals corresponding to resonance bands to one of values of −3, −1, 1, and 3.

When the above described operation is performed with respect to all of electrical signals output from the resonator sensor 100, a bitmap of a two-dimensional band gradient over time may be generated. The bitmap of the two-dimensional band gradient differs depending on a speaker and thus may be a characteristic that is used for speaker recognition.

FIG. 8 is a diagram showing a bitmap of a two-dimensional band gradient over time according to an example embodiment.

As shown in FIG. 8, the bitmap of the band gradient may be generated for each time frame. The processor 210 may generate the bitmap of the band gradient according to a frame of a predetermined time unit, but is not limited thereto. When the bitmap of the band gradient is generated in the predetermined time unit and successively generated bitmaps have the same value, only one bitmap may be used to perform speaker recognition. For example, a speaker may utter a syllable 'u' for two seconds and a plurality of bitmaps of the band gradient may be generated according to a frame of a predetermined time unit. In such a case, the processor 210 may use the plurality of bitmaps of the band gradient generated during the utterance for two seconds for speaker recognition, or alternatively, may remove the same bitmaps from among the plurality of bitmaps of the band gradient generated during the utterance for two seconds and may use only a bitmap that is not the same for speaker recognition. A method of generating a bitmap of the two-dimensional band gradient may vary according to the utilization of recognition.

The processor 210 may register a speech of a speaker by generating a personalized speaker model of a specific speaker using the bitmap of the band gradient and storing the personalized speaker model as an authentication template. When a speech of an unspecified speaker is received, the speech of the unspecified speaker may be compared with a previously stored authentication template to determine a similarity and whether the unspecified speaker is the same as a registered speaker is determined based on the similarity.

For example, when a word 'start' is used to register a speech for recognition, a specific speaker may utter the word 'start'. Each or some of resonators of the resonator sensor 100 may output an electrical signal corresponding to the utterance of the word 'start'. The processor 210 may calculate and encode a magnitude difference of electrical signals corresponding to resonance bands from the electrical signal received from the resonator sensor 100, generate a bitmap of the band gradient, and then calculate a personalized characteristic value corresponding to the utterance of the word 'start' by using the bitmap of the band gradient, generate a personalized speaker model with the personalized characteristic value, and register the personalized speaker model as an authentication template. Then, when the unspecified speaker utters the word 'start', the processor 210 may generate a bitmap of a band gradient corresponding thereto and calculate characteristic values corresponding to the utterance of the word 'start' by the unspecified speaker by using the bitmap. The processor 210 may convert the characteristic values into a form that may be compared with the authentication template, compare the personalized speaker model of the converted form with the authentication template, and perform speaker recognition by determining whether the unspecified speaker is a registered speaker.

As described above, when speaker recognition is performed by using the band gradient, that is, the magnitude difference of electrical signals corresponding to resonance bands, a processing process may be simplified as compared with speech processing using STFT (Short Time Fourier Transform) and MFCC (Mel Frequency Cepstrum Coefficients).

A speaker recognition method according to an example embodiment may additionally use a vowel. Vowels may include formants that are constituent phonemes. Here, the formant means a distribution of the frequency intensity of acoustic energy generated due to a cavity resonance phenomenon caused by a shape, a size, and the like of a passage of a person's pronunciation organ, that is, a frequency band in which acoustic energy concentrates.

Figure 9:
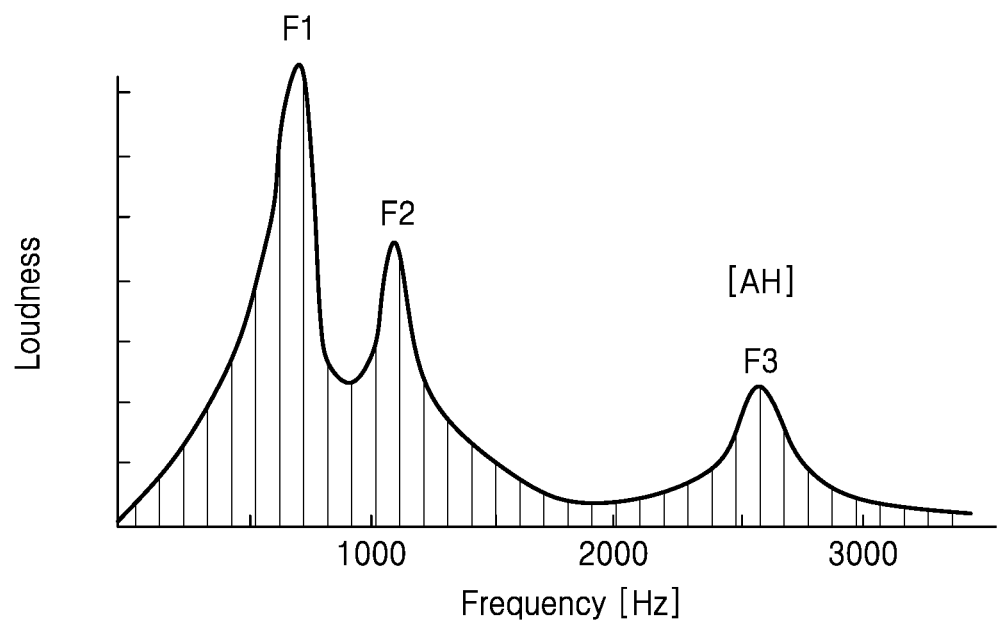
FIG. 9 is a spectrum showing a resonance band of a vowel [AH] pronunciation.
Figure 10:
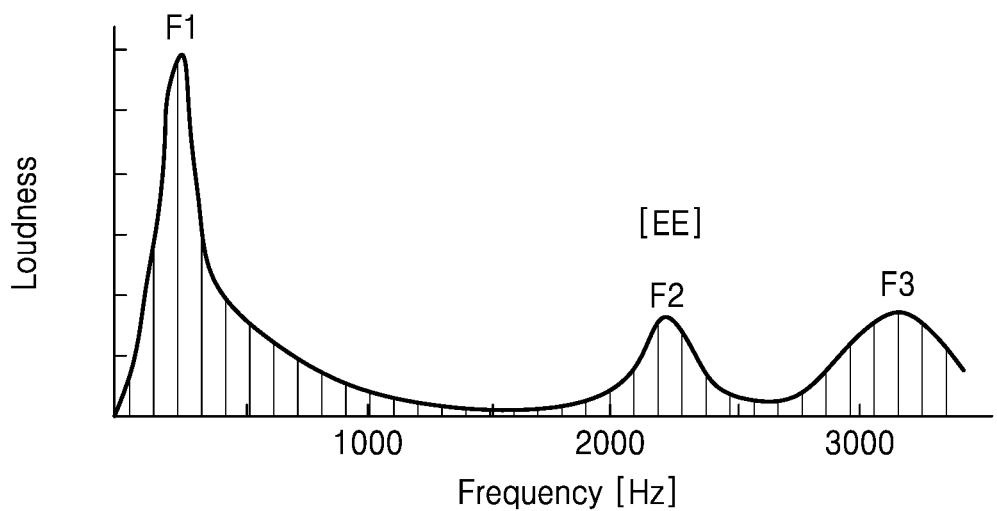
FIG. 10 is a spectrum showing a resonance band of a vowel [EE] pronunciation.

FIGS. 9 and 10 are graphs showing an energy distribution of a specific vowel in a speech model. FIG. 9 is a spectrum showing a resonance band of a vowel [AH] pronunciation. FIG. 10 is a spectrum showing a resonance band of a vowel [EE] pronunciation.

Referring to the spectrums of the vowels with reference to FIGS. 9 and 10, it may be seen that not one resonance band but several resonance bands exist. Depending on a speaker, the spectrums of the vowel [AH] pronunciation and the vowel [EE] pronunciation may be different. However, such a change in the spectrum depending on the speaker is not significant so as to make it impossible to distinguish vowels [AH] from [EE]. This equally applies equally to pronunciation of other vowels. In other words, vowels may be generally distinguished from each other, despite a speech characteristic of each individual speaker.

Resonance bands in a vowel may be referred to as a first formant F1, a second formant F2, and a third formant F3 from the order of a lower frequency side. A center frequency of the first formant F1 is the smallest. A center frequency of the third formant F3 is the largest. A center frequency of the second formant F2 may have a magnitude between the first formant F1 and the third formant F3. Upon comparing a speech of the speaker with an output of each of the resonators R1, R2 . . . Rn of the resonator sensor 100 shown in FIG. 1, a center frequency of the speech may be determined and locations of the first formant F1, the second formant F2, and the third formant F3 may be obtained. When the locations of the first formant F1, the second formant F2, and the third formant F3 are obtained, a vowel in the speech from the speaker may be obtained.

Figure 11:
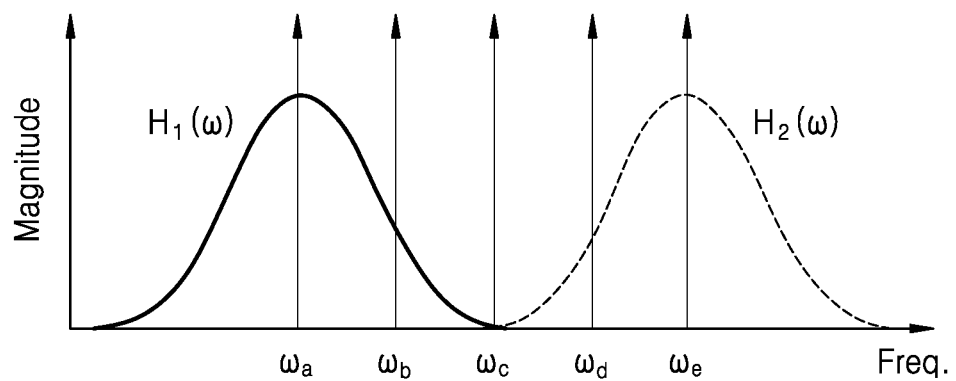
FIGS. 11 and 12 are graphs illustrating estimating a position of a formant using resonators spaced from each other in connection with vowel determination according to an example embodiment.
Figure 12:
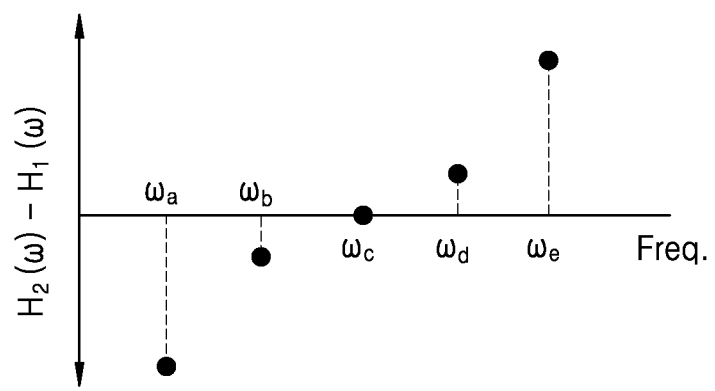

FIGS. 11 and 12 are graphs illustrating estimating a position of a formant using resonators spaced from each other in connection with vowel determination according to an example embodiment.

Two different resonators among the resonators R1, R2, . . . , Rn of the resonator sensor 100 shown in FIG. 1 may output an electrical signal corresponding to an input signal from a speaker. The two resonators that are spaced apart from each other may be adjacent or non-adjacent to each other. Referring to FIG. 11, a first resonator having a resonance frequency $\omega_a$ and a second resonator having a resonance frequency $\omega_e$ may output electrical signals of different magnitudes corresponding to the input signal of the speaker. For example, when the center frequency of the speech is $\omega_a$, an output value $H_1(\omega)$ of the first resonator may be very large, and an output value $H_2(\omega)$ of the second resonator may be absent or very small. When the center frequency of the speech is $\omega_c$, both the output value $H_1(\omega)$ of the first resonator and the output value $H_2(\omega)$ of the second resonator may be very small. When the center frequency of the speech is $\omega_e$, the output value $H_1(\omega)$ of the first resonator may be absent or very small, and the output value $H_2(\omega)$ of the second resonator may be very large.

In other words, when the center frequency of the speech has a value such as $\omega_a$, $\omega_b$, $\omega_c$, $\omega_d$ or $\omega_e$ etc., the output values of the first resonator and the second resonator are different from each other. Therefore, it may be seen that a difference $H_2(\omega)-H_1(\omega)$ between the output values of the first resonator and the second resonator also varies with the center frequency of the speech as shown in FIG. 12. Thus, the center frequency of the speech may be determined inversely from the difference between the output values of the two resonators. That is, the formant which is the center frequency of the speech may be determined using a magnitude difference of electrical signals corresponding to resonance bands between resonators, and a vowel may be determined from a position of the center frequency.

The vowel generally includes three formants. The processor 210 may select four resonators of the resonator sensor 100 and determine the formants using electrical signals output from the selected resonators.

Figure 13:
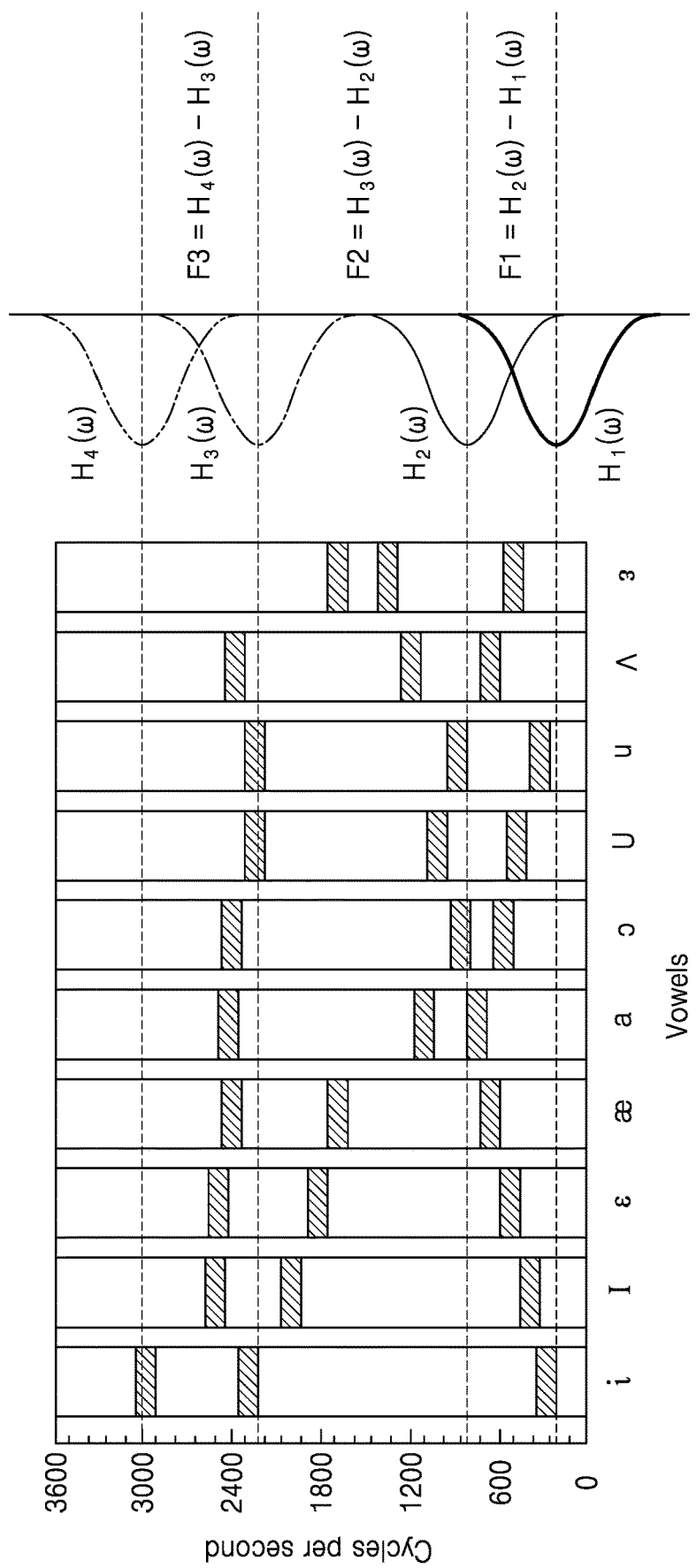
FIG. 13 is a reference diagram showing positions of formants of a vowel according to an example embodiment.

FIG. 13 is a reference diagram showing positions of formants of a vowel according to an example embodiment.

Referring to FIG. 13, the horizontal axis indicates types of vowels and the vertical axis indicates center frequencies of the first formant F1, the second formant F2, and the third formant F3 according to the vowels. Positions of the first formant F1, the second formant F2, and the third formant F3 according to the vowels shown in FIG. 13 may use position data of formants of generally known vowels. For example, the positions of the formants of the vowels may be obtained using a vowel information database by various speakers which may be referred to as a universal background model (UBM).

As shown in FIG. 13, it may be seen that each vowel generally includes three formants. It may be seen that the positions of the formants are different according to the vowels. A formant having the lowest center frequency among the three formants may be referred to as the first formant, a formant having the highest center frequency as the third formant, and a formant having an intermediate center frequency as the second formant.

In order to determine the three formants, the processor 210 may select four resonators having different resonance frequencies from the resonator sensor 100 shown in FIG. 1. When selecting the four resonators, the processor 210 may select any one of the resonators having a resonance frequency lower than a center frequency of the first formant as a first resonator, any one of the resonators having a resonance frequency between the center frequency of the first formant and a center frequency of the second formant as a second resonator, any one of the resonators having a resonance frequency between the center frequency of the second formant and a center frequency of the third formant as a third resonator, and any one of the resonators having a resonance frequency higher than the center frequency of the third formant as a fourth resonator. For example, the processor 210 may select four resonators having resonance frequencies of about 300 Hz, about 810 Hz, about 2290 Hz, and about 3000 Hz, respectively.

The processor 210 may determine the first through third formants using a difference between output values of two resonators having neighboring resonance bands among the four resonators. For example, the processor 210 may determine the first formant by a difference $H_2(\omega)-H_1(\omega)$ between output values of the first and second resonators and the second formant by a difference $H_3(\omega)-H_2(\omega)$ between output values of the second and third resonators. The processor 210 may determine the third formant by a difference $H_4(\omega)-H_3(\omega)$ between output values of the third and fourth resonators. The processor 210 may determine the first through third formants respectively from the difference $H_2(\omega)-H_1(\omega)$ between the output values of the first and second resonators, the difference $H_3(\omega)-H_2(\omega)$ between the output values of the second and third resonators, and the difference $H_4(\omega)-H_3(\omega)$ between the output values of the third and fourth resonators and determine an uttered vowel using the first through third formants regardless of who is a speaker. The determined vowel may be used to determine whether an uttering speaker is a registered speaker. Specifically, only a model corresponding to the determined vowel among personalized speaker models included in an authentication template may be used for speaker recognition.

Figure 14:
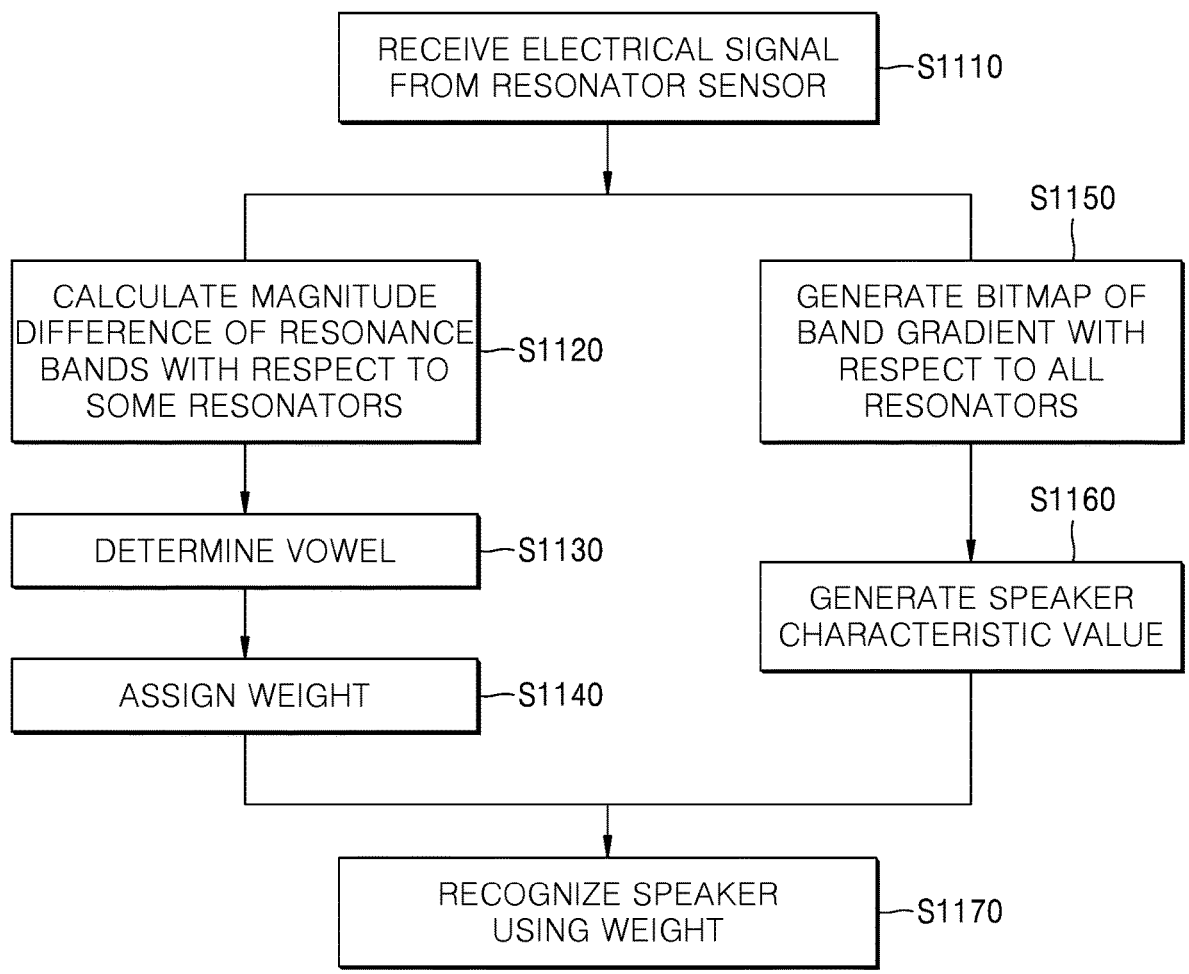
FIG. 14 is a flowchart illustrating a method of recognizing a speaker using a vowel and a bitmap of a band gradient.

FIG. 14 is a flowchart illustrating a method of recognizing a speaker using a vowel and a bitmap of a band gradient.

Referring to FIG. 14, the processor 210 may receive an electrical signal corresponding to a speech of the speaker from the resonator sensor 100 (S1110). For example, the speaker may utter 'we' and the resonator sensor 100 may output an electrical signal corresponding to 'we' such that the processor 210 may receive the electrical signal corresponding to 'we'.

The processor 210 may calculate a magnitude difference of electrical signals corresponding to resonance bands using the electrical signal received from some resonators (S1120). Some resonators may be predefined to determine formants of the vowel. For example, the processor 210 may calculate the magnitude difference of electrical signals corresponding to resonance bands using electrical signals received from four predetermined resonators to determine the three formants in the manner as described above.

The processor 210 may determine the vowel using a magnitude difference of electrical signals corresponding to resonance bands of some resonators (S1130). For example, the processor 210 may determine first through third formants using a magnitude difference of the four resonator bands and determine the vowel using relative position relationships of the first through third formants. When the vowel is determined, the graph shown in FIG. 13 may be used. For example, the processor 210 may determine vowels 'u' and 'i' in time sequence using the relative position relationships of the first through third formants.

The processor 210 may assign a weight to the determined vowel (S1140). For example, the processor 210 may assign the weight of the determined vowel to a higher value than weights of other vowels.

The processor 210 may generate the bitmap of the band gradient using the electrical signal received from all of the resonators included in the resonator sensor 100 (S1150). Specifically, the processor 210 may calculate and encode the magnitude difference of electrical signals corresponding to resonance bands using the electrical signal received from all of the resonators of the resonator sensor 100 to generate the bitmap of the band gradient. In operation S1150, the processor 210 generates the bitmap of the band gradient using the electrical signal received from all of the resonators. However, the processor 210 may generate the bitmap of the band gradient using the electrical signal received from some resonators. The bitmap of the band gradient needs to include more detailed information about the speech of the speaker than the vowel determination, and thus the number of bitmaps of the band gradient may be greater than the number of resonators used for vowel determination.

The processor 210 may generate a speaker characteristic value using the generated bitmap of the band gradient (S1160). The processor 210 may generate the speaker characteristic value from the bitmap of the band gradient using fast Fourier transform (FFT), 2D discrete cosine transform (DCT), dynamic time warping (DTW), an artificial neural network, vector quantization (VQ), a Gaussian mixture model (GMM), etc. The speaker characteristic value may be converted into a form that may be compared with an authentication template. During this conversion process, the processor 210 may use a universal background model (UBM).

The processor 210 may recognize the speaker by comparing the converted speaker characteristic value with the authentication template using the weight (S1170). The processor 210 may apply a high weight to a model corresponding to a determined vowel component of the authentication template and a low weight to other vowel components. For example, when determined vowels are [u] and [i], the processor 210 may apply high weights to models corresponding to components of [u] and [i] in the authentication template and apply a low weight to other components to compare the converted speaker characteristic value with the authentication template. When a comparison result (or a similarity) is equal to or greater than a reference value, the processor 210 may determine the uttering speaker as a registered speaker, and when the comparison result is less than the reference value, the processor 210 may determine that the uttering speaker is not the registered speaker.

The assigned weight may be 1 or 0. In other words, the processor 210 may use only a model corresponding to the determined vowel of the authentication template for comparison.

Figure 15:
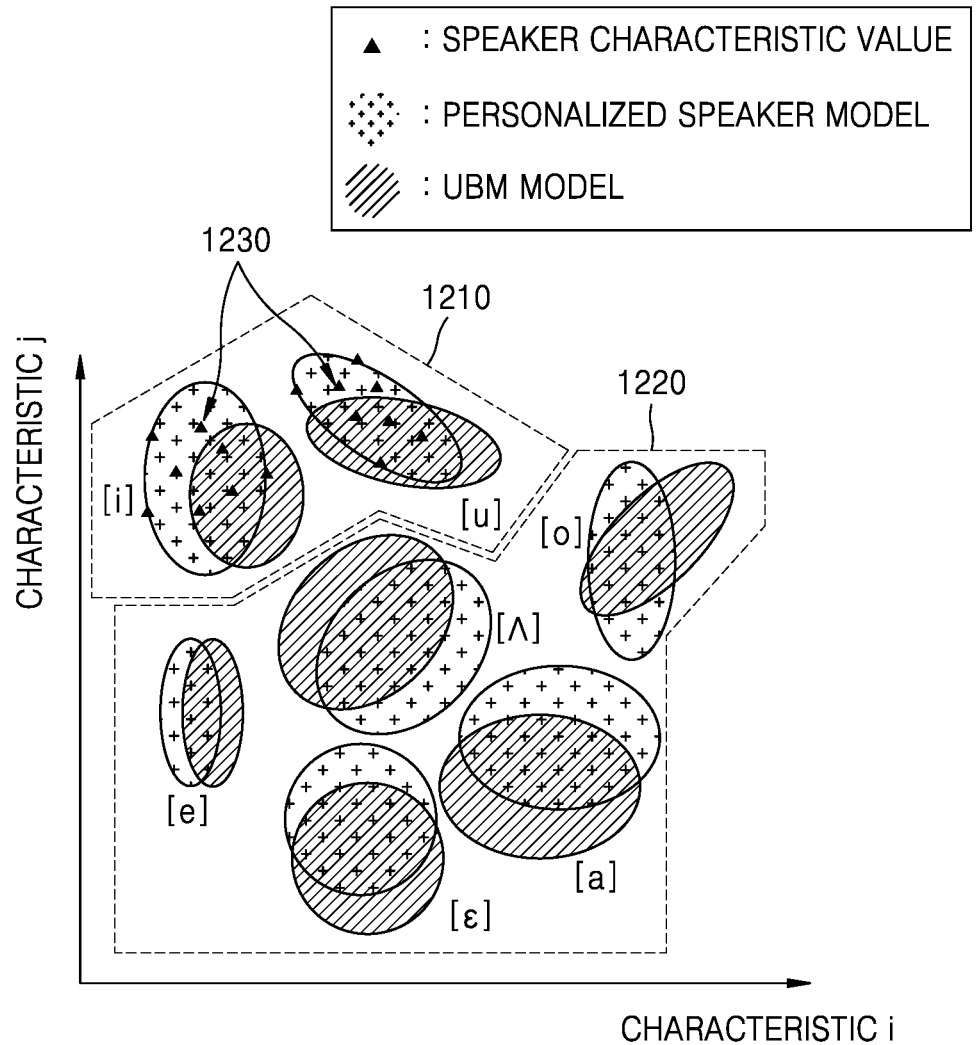
FIG. 15 is a reference diagram for explaining a comparison between speaker characteristic values and authentication templates in a short speech.

FIG. 15 is a reference diagram for explaining a comparison between speaker characteristic values and authentication templates in a short speech.

In FIG. 15, hatched areas indicate UBM models, "+" pattern areas indicate personalized speaker models, that is, the registered authentication templates, and ▲ indicate the speaker characteristic values. For example, when a speaker shortly utters 'we', the processor 210 may obtain [u] and [i] as uttered vowel components. When the processor 210 generates speaker characteristic values 1230, the vowel components of [u] and [i] may be characteristics indicating the speaker. Accordingly, when determining a similarity with respect to the speaker characteristic values 1230, by applying a high weight of a model 1210 corresponding to the vowel components of [u] and [i] in the authentication templates and applying a low weight of a model 1220 corresponding to other vowel components, an influence of the uttered vowel component is high, and thus accuracy of speaker recognition may be improved.

Operations S1150 and S1160 of generating the speaker feature value and operations S1120 to S1140 of assigning the weights are not necessarily performed sequentially but two processes may be performed simultaneously or some operations of a process for assigning the weights may be performed first, and then operations S1150 and S1160 of generating the speaker feature value may be performed. For example, the resonator sensor 100 shown in FIG. 1 may proceed to operation S1130 of determining a vowel from a speech of a speaker using four resonators having different bands, and at the same time, proceed to operation S1150 of generating a bitmap of a band gradient using signals output from all of the resonators R1, R2, . . . Rn.

Although the method of recognizing the speaker using both the bitmap of the band gradient and the vowel determination is described above, the speaker may be recognized using only the bitmap of the band gradient. For example, in a case where it is agreed to recognize the speaker by using a predetermined specific word (e.g., 'start'), an authentication template may be recognized only by a personalized model corresponding to the word 'start' of a specific speaker. In this case, the speaker may be recognized using only the bitmap of the band gradient, and the vowel determination may be unnecessary. Alternatively, a large number of personalized models may be required for the authentication template for recognition even when a specific speaker randomly utters words, phrases, or sentences. In this case, personalized models may be classified by vowels, and a model corresponding to a determined vowel may be used for comparison for recognition. Also, the speaker may be recognized by applying a weight to a vowel corresponding to a characteristic value of the speaker that is generated using a method other than the bitmap of the band gradient.

As described above, in the speaker recognition method and apparatus using the resonator according to an example embodiment, the resonator sensor 100 may include a plurality of mechanical resonators of various types. The resonator sensor 100 may have various shapes, and shapes or arrangements of resonators included therein may be selected as needed. Center frequencies of the resonators included in the resonator sensor 100 may be changed by adjusting a length L of the supporting unit 14 shown in FIG. 2. The resonators of the resonator sensor 100 may be formed to have various center frequency intervals according to need of a user.

Figure 16:
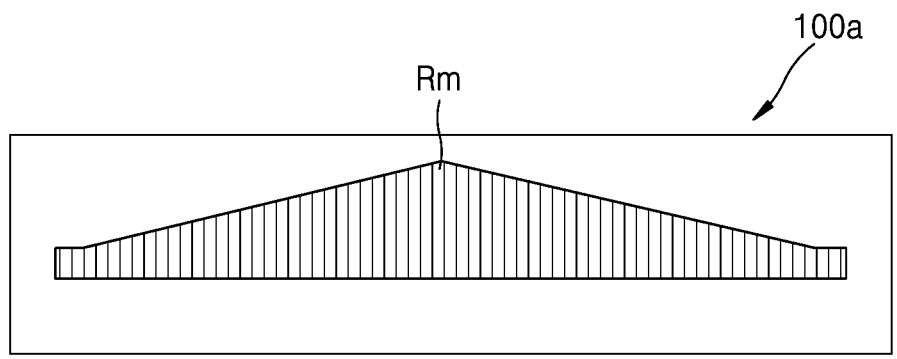
FIGS. 16 and 17 are diagrams showing examples in which center frequencies of a plurality of resonators of a resonator sensor are set at an equal interval according to an example embodiment.
Figure 17:
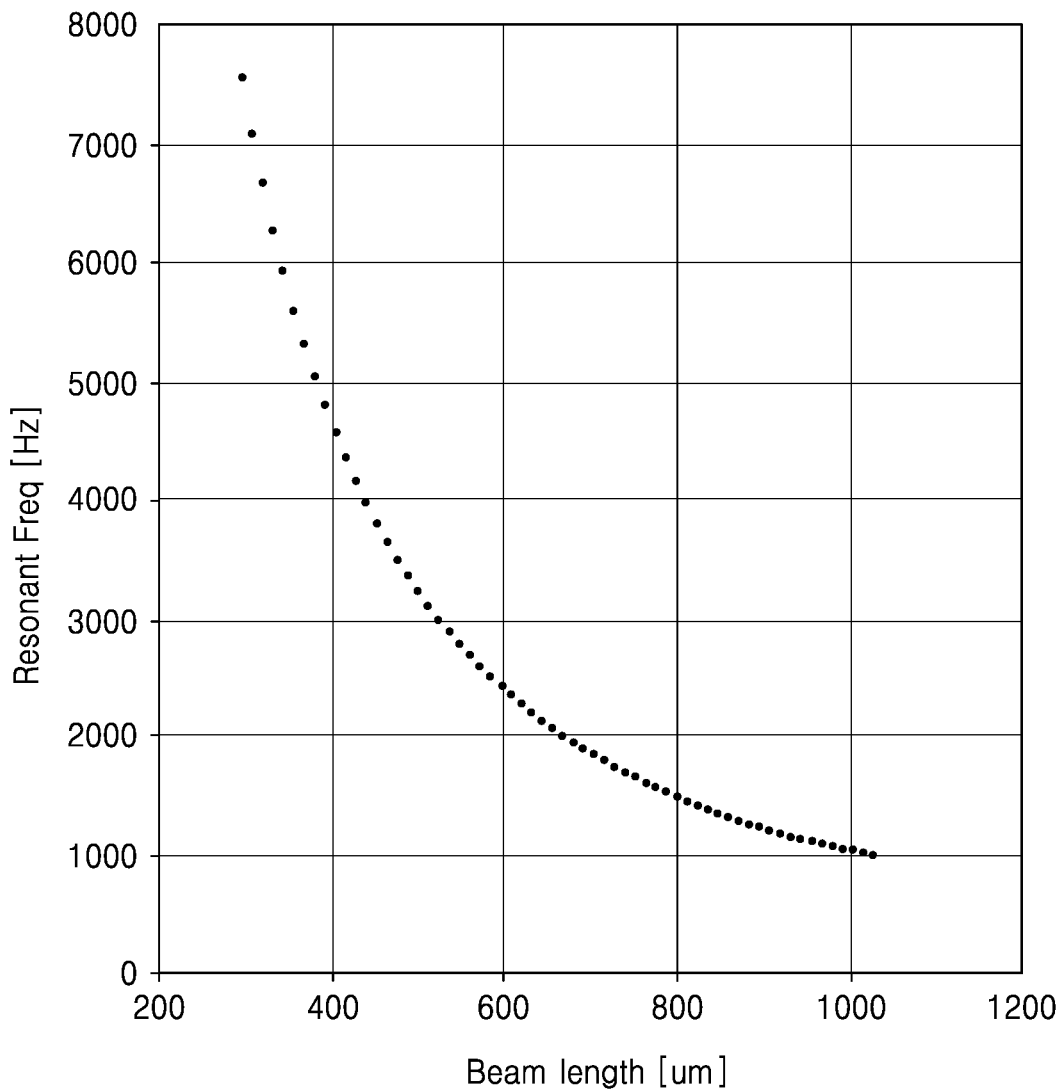

FIGS. 16 and 17 are diagrams showing examples in which center frequencies of a plurality of resonators of a resonator sensor 100a are set at an equal interval according to an example embodiment.

Referring to FIG. 16, center frequencies of resonators Rm may be inversely proportional to a resonator length, that is, a square of the length L of the supporting unit 14 shown in FIG. 2. Thus, as shown in FIG. 17, when differences in length between the adjacent resonators Rm are constant, the resonators Rm included in the resonator sensor 100a may make a ratio of resonators having a center frequency in a relatively low frequency region higher than a ratio of resonators having a center frequency in a high frequency region.

Figure 18:
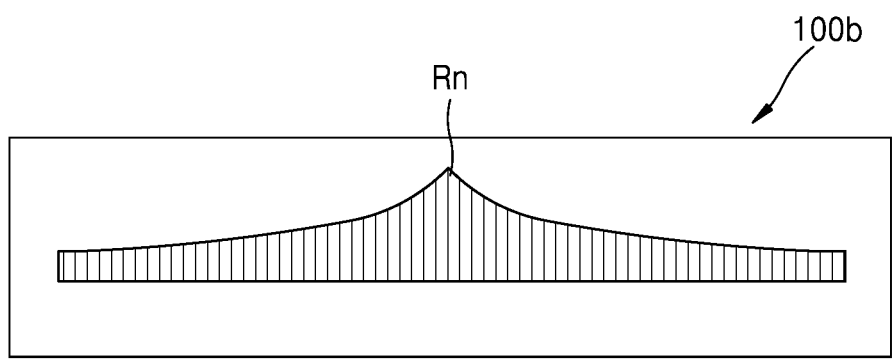
FIGS. 18 and 19 are diagrams showing examples in which center frequencies of a plurality of resonators of a resonator sensor are set at a constant interval according to an example embodiment.
Figure 19:
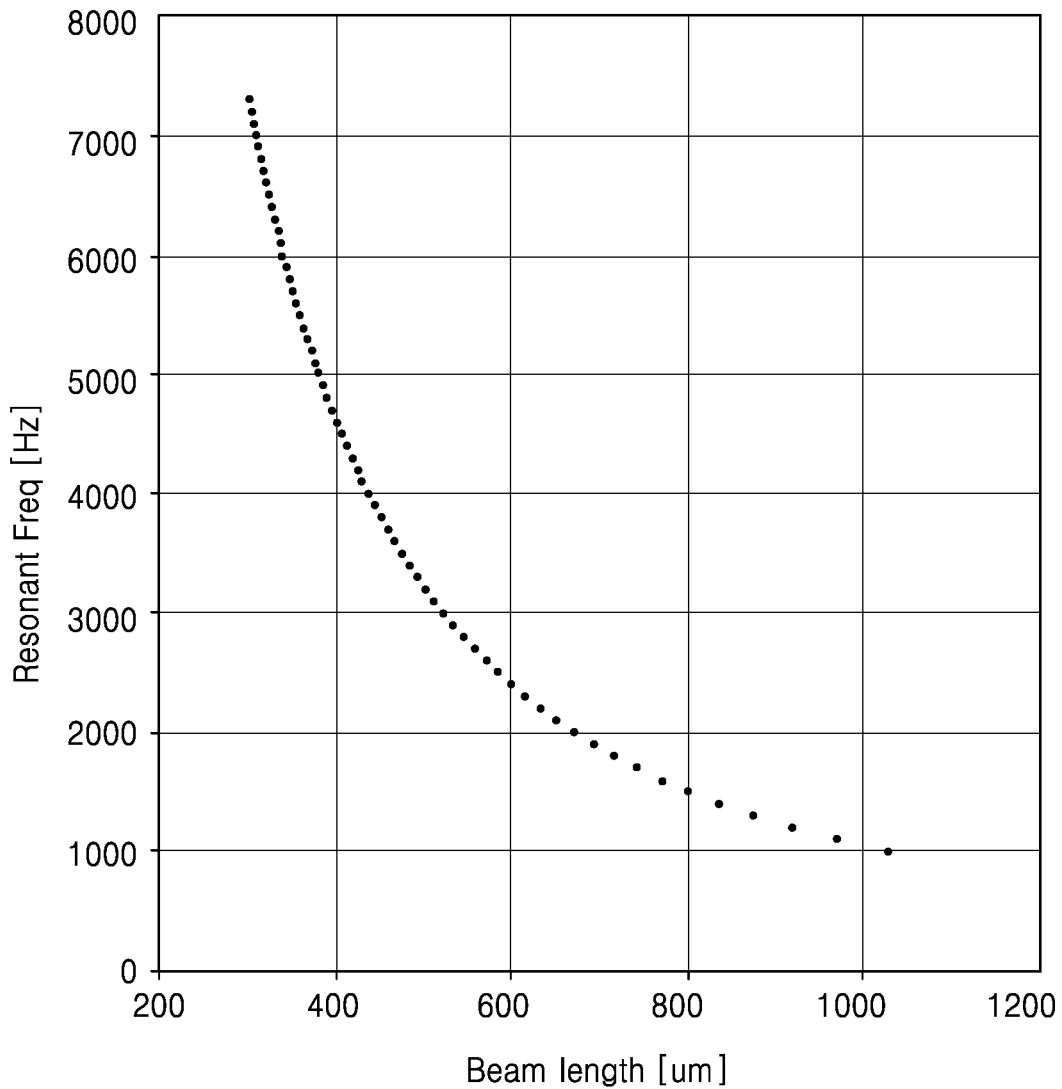

FIGS. 18 and 19 are diagrams showing examples in which center frequencies of a plurality of resonators of a resonator sensor 100b are set at a constant interval according to an example embodiment.

Referring to FIGS. 18 and 19, resonators Rn included in the resonator sensor 100b may be formed such that differences in length between the resonators Rn adjacent to each other become smaller as the beam length of the resonators becomes shorter. In this case, the differences in the center frequencies of the resonators Rn may be set to have a uniform constant interval.

Figure 20:
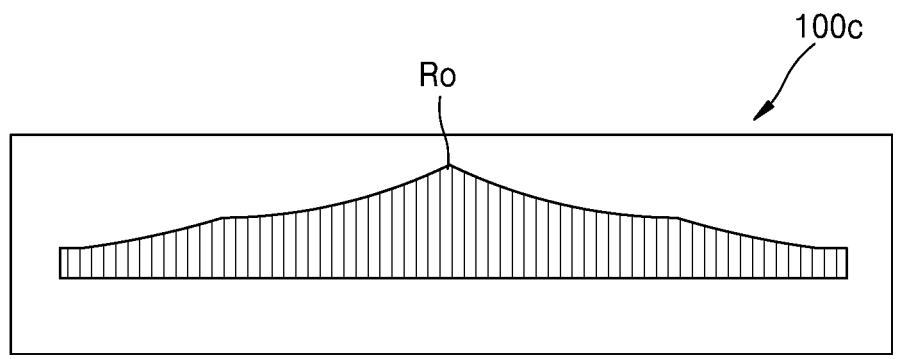
FIGS. 20 and 21 are diagrams showing examples in which center frequencies of a plurality of resonators of a resonator sensor are set at an arbitrary interval according to an example embodiment.
Figure 21:
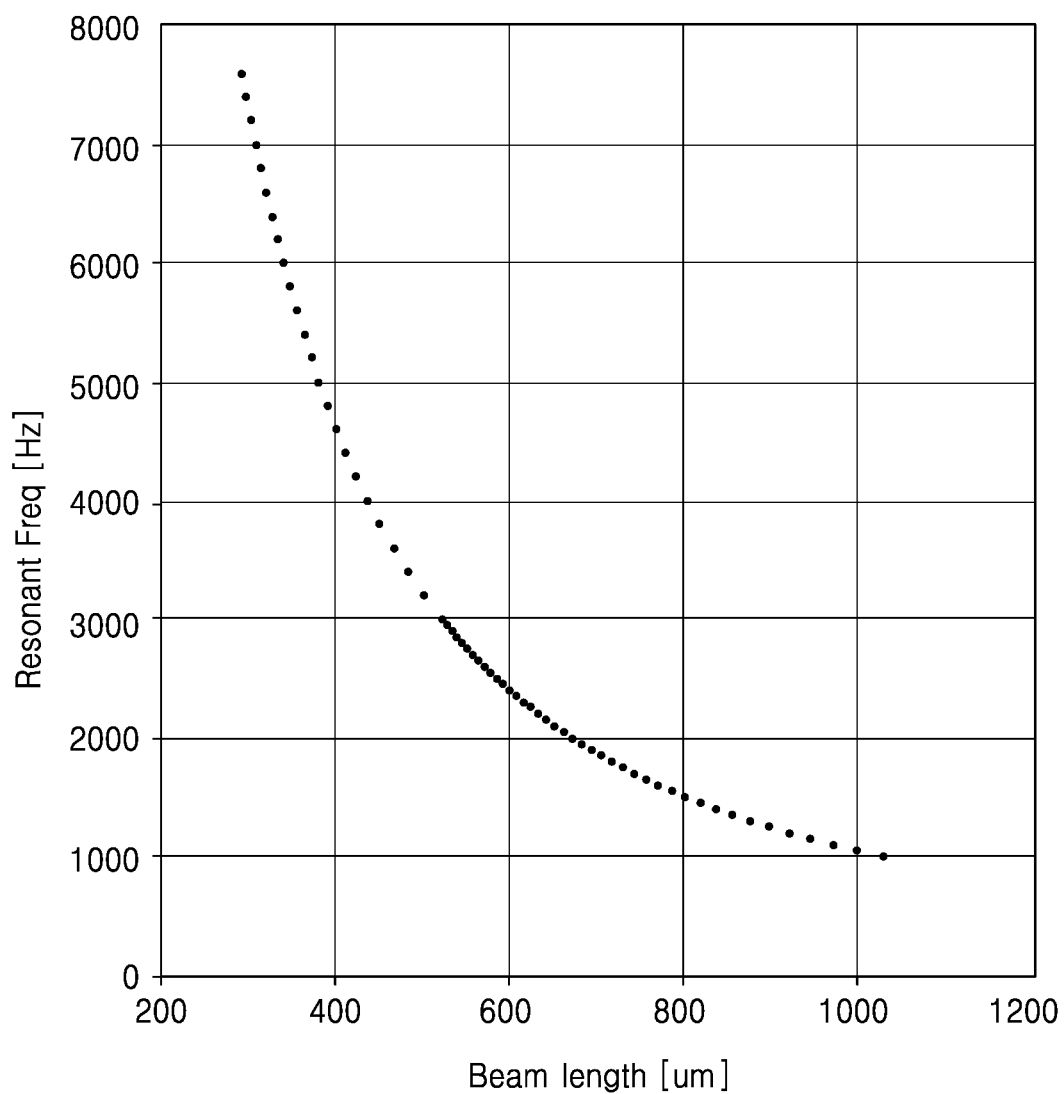

FIGS. 20 and 21 are diagrams showing examples in which center frequencies of a plurality of resonators of a resonator sensor 100c are set at an arbitrary interval according to an example embodiment.

Referring to FIGS. 20 and 21, the resonator sensor 100c may be formed such that intervals of lengths of resonators Ro included in the resonator sensor 100c do not have a specific regularity. For example, in FIG. 21, to increase a ratio of resonators having a center frequency in the range of 2000 Hz to 3000 Hz, lengths of the resonators in some periods may be adjusted.

As described above, in the speaker recognition method and device using the resonator according to an example embodiment, the resonator sensors 100, 100a, 100b, and 100c may include resonators having resonance frequencies of equal and constant intervals or resonators having resonance frequencies of arbitrary bands.

Figure 22:
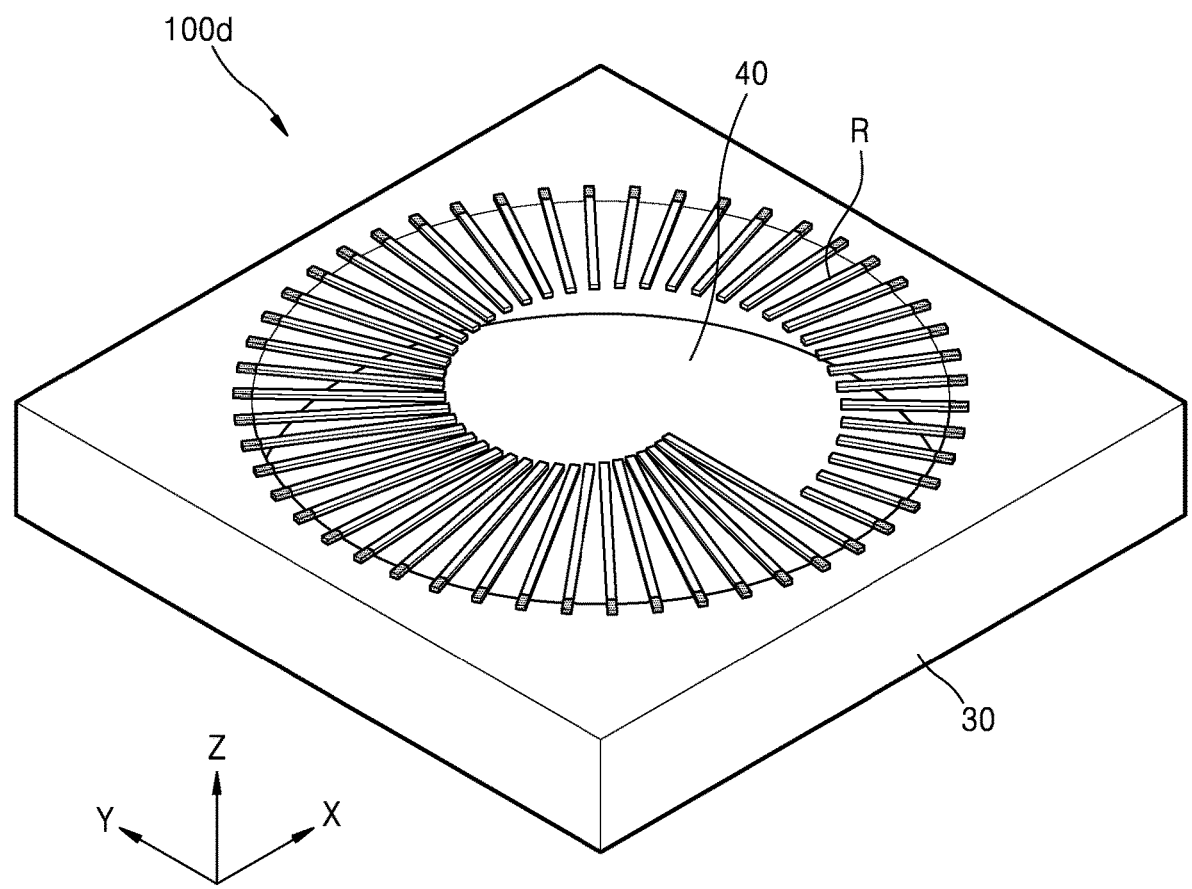
FIG. 22 is a plan view showing a schematic structure of a resonator sensor including a plurality of resonators according to an example embodiment.

FIG. 22 is a plan view showing a schematic structure of a resonator sensor 100d including a plurality of resonators according to an example embodiment.

Referring to FIG. 22, the resonator sensor 100d may include a supporting unit 30 having a cavity or a through hole 40 formed in a central portion thereof, and a plurality of resonators R extending from the supporting unit 30 and surrounding the cavity or the through hole 40. The resonators R1, R2, . . . , Rn of the resonator sensor 100 extend in one direction in FIG. 1, whereas, as shown in FIG. 22, the resonator sensor 100d according to an example embodiment may be formed to have various structures.

Figure 23:
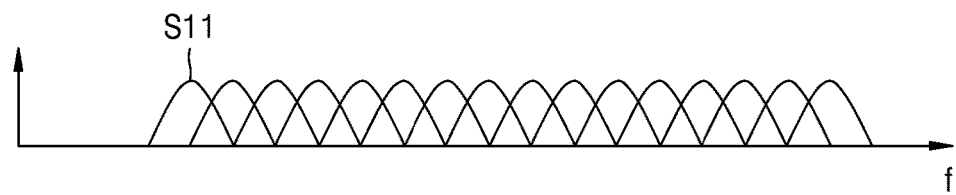
FIGS. 23, 24, and 25 are graphs illustrating examples of variously changing bandwidths of a plurality of resonators of a resonator sensor according to an example embodiment.
Figure 24:
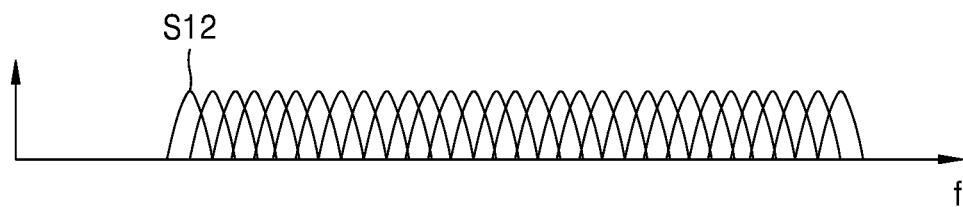
Figure 25:
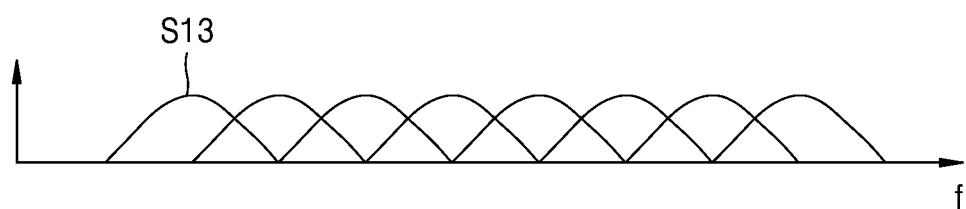

FIGS. 23 through 25 are graphs illustrating examples of variously changing bandwidths of a plurality of resonators of a resonator sensor according to an example embodiment.

In the resonator sensor according to an example embodiment, bands of the resonators may be adjusted (e.g., narrowed) in order to change frequency intervals of the bands of the resonators as necessary or improve a resolution of a specific band. For example, when a resonator frequency bandwidth in FIG. 23 is referred to as a reference bandwidth S11, in the case of FIG. 24, the resonators may be formed to have a bandwidth S12 narrower than the reference bandwidth S11. Further, as shown in FIG. 25, the resonators may be formed to have a bandwidth S13 wider than the reference bandwidth S11 of FIG. 23.

Figure 26:
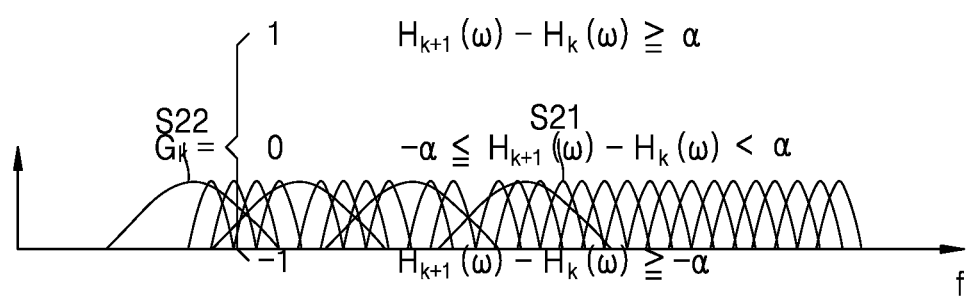
FIG. 26 is a graph showing that a bandwidth of a specific resonator among a plurality of resonators of a resonator sensor is set wide according to an example embodiment.

FIG. 26 is a graph showing that a bandwidth of a specific resonator among a plurality of resonators of a resonator sensor is set wide according to an example embodiment.

Referring to FIG. 26, a bandwidth S22 of specific resonators of the resonator sensor 100 that are used to determine a vowel of an input signal of FIG. 3 may be formed to be relatively larger than a bandwidth S21 of remaining resonators of the resonator sensor 100 such that a process of determining the vowel of the input signal may be performed more efficiently.

According to one or more example embodiments, a substantial length of speech is not required for speaker recognition, and accurate speaker recognition is possible even with a relatively short input signal. The efficiency of speaker recognition may be improved by determining a vowel in an input signal and using a limited comparison group for speaker recognition.

According to one or more example embodiments, a resonator sensor may not require Fourier transform, may maintain frequency band information, and may improve time resolution. Since only a difference between electrical signals of adjacent resonators is used, the influence on a common noise may be removed.

The speaker recognition method and apparatus as described above may be applied to various fields. For example, the speaker recognition method and apparatus may operate or unlock a specific device employed or installed in a mobile device, a home, or a vehicle by accurately recognizing whether a speaker is a registered speaker through a speech signal.

While one or more exemplary embodiments have been described with reference to the figures, it will be understood by those of ordinary skill in the art that various changes in form and details may be made therein without departing from the spirit and scope of the inventive concept as defined by the following claims.

The invention claimed is:

1. A method of recognizing a speaker, the method comprising:
 receiving a plurality of electrical signals corresponding to a speech of the speaker from a plurality of resonators having different resonance bands;
 obtaining a difference of magnitudes of the plurality of electrical signals corresponding to resonance bands; and
 recognizing the speaker based on the difference of magnitudes of the plurality of electrical signals,
 wherein the difference of magnitudes of the plurality of electrical signals comprises a difference of magnitudes of electrical signals output from two resonators having neighboring resonance frequencies,
 wherein the recognizing the speaker comprises:
 generating a bitmap of a band gradient by encoding the difference of magnitudes of the plurality of electrical signals; and
 recognizing the speaker based on the bitmap of the band gradient.

2. The method of claim 1, wherein the encoding comprises converting the difference of magnitudes of the plurality of electrical signals into any one of three or more odd-number of values, by using one or more threshold values.

3. The method of claim 2, wherein the three or more odd-number of values comprise values that have a same absolute value and opposite signs.

4. The method of claim 2, wherein the three or more odd-number of values comprise −a, 0, and a, where a is a constant.

5. The method of claim 1, wherein the recognizing the speaker further comprises registering the speaker by:
 generating a speaker model based on the bitmap of the band gradient; and
 registering the speaker model as an authentication template.

6. The method of claim 5, wherein the recognizing the speaker further comprises determining whether the speaker is a registered speaker by:
 generating a characteristic value based on the bitmap of the band gradient; and
 determining whether the speaker is the registered speaker based on comparison between the characteristic value and the authentication template.

7. The method of claim 1, wherein the recognizing the speaker comprises: determining a vowel included in the speech of the speaker based on the difference of magnitudes of the plurality of electrical signals.

8. The method of claim 7, wherein the determining the vowel comprises:
 estimating relative positions of formants based on the difference of magnitudes of the plurality of electrical signals; and
 determining the vowel based on the relative positions of the formants.

9. The method of claim 8, wherein a number of the formants is three.

10. The method of claim 8, wherein the difference of magnitudes of the plurality of electrical signals is determined based on magnitudes of electrical signals received from four resonators of a resonator sensor.

11. The method of claim 7, wherein the difference of magnitudes of the plurality of electrical signals comprises a plurality of differences of magnitudes of the plurality of electrical signals, and the recognizing the speaker further comprises:
 assigning a weight to a model corresponding to the determined vowel in an authentication template;
 generating the bitmap of a band gradient based on a first difference of magnitudes of the plurality of electrical signals, which is different from a second difference of magnitudes of the plurality of electrical signals used to determine the vowel;
 generating a characteristic value based on the bitmap of the band gradient; and
 recognizing whether the speaker is a registered speaker based on comparison between the characteristic value and the authentication template, in which the model corresponding to the determined vowel is assigned the weight.

12. The method of claim 11, wherein the assigning the weight comprises assigning the weight to the model corresponding to the determined vowel that is higher than a weight assigned to a model corresponding to another vowel.

13. The method of claim 12, wherein the weight assigned to the model corresponding to the determined vowel is 1 and the weight assigned to the model corresponding to the another vowel is 0.

14. The method of claim 12, wherein a number of the first difference of magnitudes of the plurality of electrical signals used to generate the bitmap of the band gradient is greater than a number of the second difference of magnitudes of the plurality of electrical signals used to determine the vowel.

15. An apparatus for recognizing a speaker, the apparatus comprising:
 a resonator sensor comprising a plurality of resonators having different resonance bands, the plurality of resonators configured to output a plurality of electrical signals corresponding to a speech of the speaker; and
 a processor configured to obtain a difference of magnitudes of the plurality of electrical signals corresponding to resonance bands and recognize the speaker based on the difference of magnitudes of the plurality of electrical signals,
 wherein the difference of magnitudes of the plurality of electrical signals comprises a difference of magnitudes of electrical signals output from two resonators having neighboring resonance frequencies, and
 wherein the processor is further configured to generate a bitmap of a band gradient by encoding the difference of magnitudes of the plurality of electrical signals and recognize the speaker based on the bitmap of the band gradient.

16. The apparatus of claim 15, wherein the processor is further configured to encode the difference of magnitudes of the plurality of electrical signals by converting the difference of magnitudes of the plurality of electrical signals into any one of three or more odd-number of values, by using one or more threshold values.

17. The apparatus of claim 15, wherein the processor is further configured to determine whether the speaker is a registered speaker based on comparison between a characteristic value determined based on the bitmap of the band gradient and a registered authentication template.

18. The apparatus of claim 15, wherein the processor is further configured to determine a vowel included in the speech of the speaker based on the difference of magnitudes of the plurality of electrical signals.

19. The apparatus of claim 18, wherein the processor is further configured to estimate relative positions of formants based on the difference of magnitudes of the plurality of electrical signals and determine the vowel based on the relative positions of the formants.

20. The apparatus of claim 19, wherein the difference of magnitudes of the plurality of electrical signals is determined based on magnitudes of electrical signals received from four resonators of the resonator sensor.

21. The apparatus of claim 19, wherein the difference of magnitudes of the plurality of electrical signals comprises a plurality of differences of magnitudes of the plurality of electrical signals, and the processor is further configured to:
  assign a weight to a model corresponding to the determined vowel in an authentication template,
  generate a characteristic value based on a first difference of magnitudes of the plurality of electrical signals, which is different from a second difference of magnitudes of the plurality of electrical signals used to determine the vowel, and
  recognize the speaker based on comparison between the characteristic value and the authentication template, in which the model corresponding to the determined vowel is assigned.

22. The apparatus of claim 21, wherein the processor is further configured to assign the weight to the model corresponding to the determined vowel that is higher than a weight assigned to a model corresponding to another vowel.

\* \* \* \* \*